United States Patent
Kane-Parry et al.

(10) Patent No.: US 9,824,207 B1
(45) Date of Patent: Nov. 21, 2017

(54) AUTHENTICATION INFORMATION UPDATE BASED ON FRAUD DETECTION

(71) Applicant: Amazon Technologies, Inc., Seattle, WA (US)

(72) Inventors: David James Kane-Parry, Seattle, WA (US); Darren Ernest Canavor, Redmond, WA (US); Jesper Mikael Johansson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 14/571,254

(22) Filed: Dec. 15, 2014

(51) Int. Cl.
    *G06F 7/04* (2006.01)
    *G06F 21/46* (2013.01)

(52) U.S. Cl.
    CPC .................. *G06F 21/46* (2013.01)

(58) Field of Classification Search
    CPC ........................................ G06F 21/46
    USPC ........................................... 726/6
    See application file for complete search history.

(56) References Cited

U.S. PATENT DOCUMENTS

| | | | |
|---|---|---|---|
| 5,394,471 | A | 2/1995 | Ganesan et al. |
| 7,606,915 | B1 | 10/2009 | Callnov et al. |
| 8,892,868 | B1 | 11/2014 | Jenks et al. |
| 9,015,803 | B1 | 4/2015 | Chaganti et al. |
| 9,379,896 | B1 * | 6/2016 | Altman ................. H04L 9/3236 |
| 2003/0140258 | A1 | 7/2003 | Nelson et al. |
| 2004/0148526 | A1 | 7/2004 | Sands et al. |
| 2005/0198537 | A1 | 9/2005 | Rojewski et al. |
| 2005/0216955 | A1 | 9/2005 | Wilkins et al. |
| 2009/0106480 | A1 * | 4/2009 | Chung ................. G06F 12/0866 711/100 |
| 2009/0172788 | A1 | 7/2009 | Vedula et al. |
| 2012/0130904 | A1 | 5/2012 | Weiss et al. |
| 2012/0209733 | A1 | 8/2012 | Pelegero et al. |
| 2012/0284783 | A1 * | 11/2012 | Jakobsson ............... G06F 21/46 726/6 |

OTHER PUBLICATIONS

U.S. Appl. No. 13/606,635, filed Sep. 7, 2012, Titled: Protecting Customer Secrets With a Trusted Execution Environment.
U.S. Appl. No. 13/887,143, filed May 3, 2013, Titled: Mapping Identifying Information.
U.S. Appl. No. 14/571,247, filed Dec. 15, 2014, Titled: Password-Based Fraud Detection.
U.S. Appl. No. 14/571,264, filed Dec. 15, 2014, Titled: Compromised Authentication Information Clearing House.

* cited by examiner

*Primary Examiner* — Christopher Brown
(74) *Attorney, Agent, or Firm* — Kilpatrick Townsend & Stockton LLP

(57) ABSTRACT

Techniques for maintaining and updating authentication information for a plurality of accounts may be provided. In an example a first set of authentication information for the plurality of accounts may be maintained. A second set of authentication information that has been marked as potentially compromised may be received. A third set of authentication information may be generated based on the overlap between the first set of authentication information and the second set of authentication information. The first set of authentication information may be updated based at least in part on one or more security authentication protocols and the third set of authentication information.

14 Claims, 18 Drawing Sheets

AUTHENTICATION INFORMATION UPDATE BASED ON FRAUD DETECTION

BACKGROUND

Current network technologies allow for a variety of interactions between business institutions and consumers or users. For example, a user may access her bank account information and perform transfers of funds to pay her electric bill all online via her computer or mobile phone. A consumer may purchase groceries or pizza for delivery to his home via websites hosted by respective businesses that offer these goods. However, most of the above interactions require the user or consumer to create an account, which may require divulging personal information that can include monetary information (such as credit card numbers) or personal information (such as contact information) in order to successfully complete a transaction. The business institutions or services that offer goods available to consumers online may have varying security measures in place for protecting a consumer's personal information. The personal information may be subject to malicious scripts/programs/actors that attempt to crack the security measures in place and gain access to the consumer's personal information for personal gain. The consumer has little input during account creation to guarantee the safety of his or her information and may rarely, if ever, receive any information indicating that his or her account is under attack.

BRIEF DESCRIPTION OF THE DRAWINGS

Various embodiments in accordance with the present disclosure will be described with reference to the drawings, in which.

DETAILED DESCRIPTION

Figure 1:
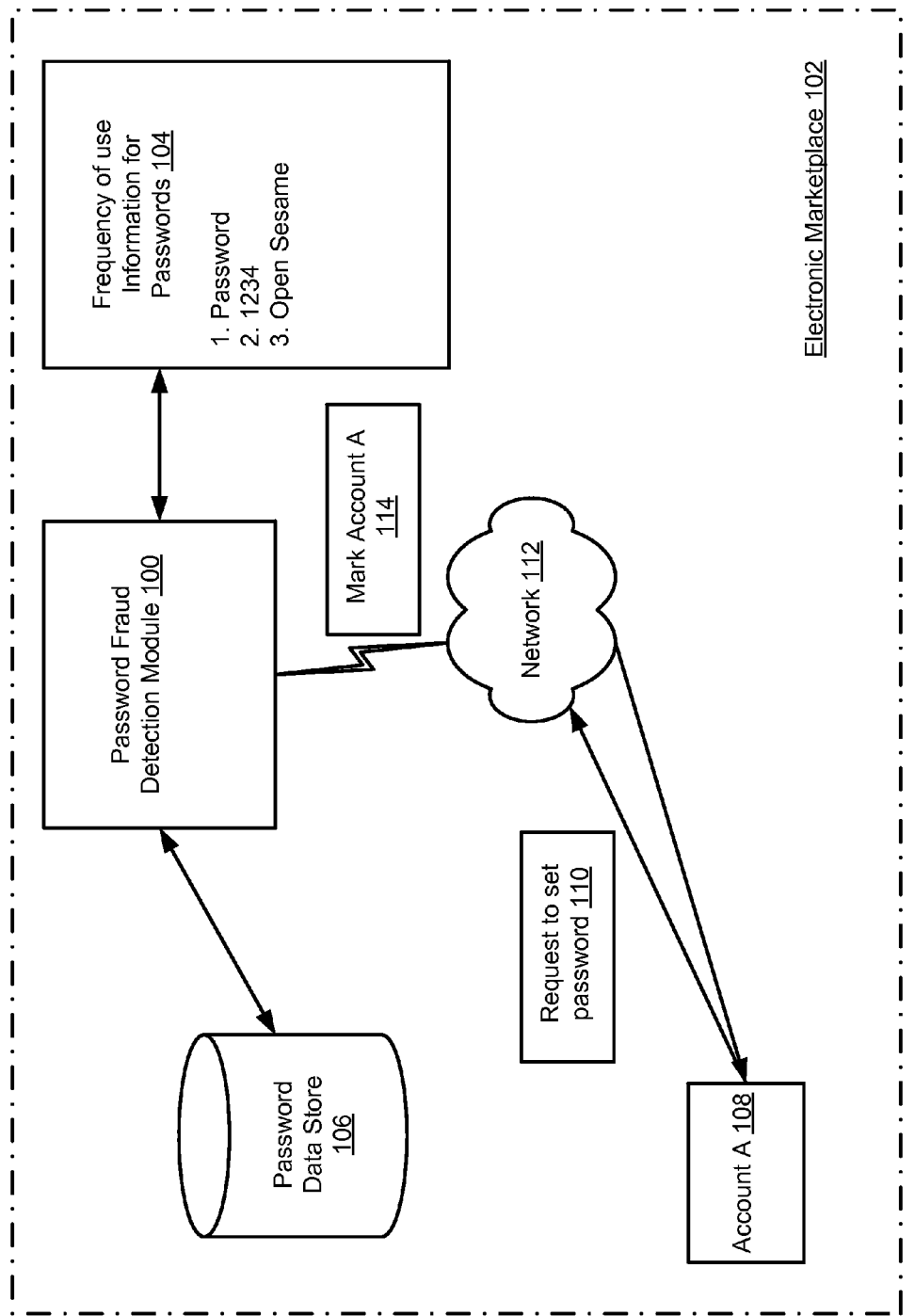
FIG. 1 is a block diagram that illustrates an example of a password fraud detection feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for providing a password fraud detection feature for authentication information, such as passwords, associated with accounts that may be utilized for login requests corresponding to online accounts such as e-commerce sites, banking entities, forums, marketplaces, etc. In accordance with at least one embodiment, the password fraud detection feature may ingest, receive, or process incoming password/authentication information set requests which can include authentication information change requests or initial authentication information set requests. In accordance with at least one embodiment, authentication information may include passwords, security question answers, biometric information, or any other suitable information for authenticating a login request for an account. The authentication information included in these requests may be compared to a ranked list, table, or database that indicates the frequency of use of authentication information for a plurality of accounts to determine if the accounts associated with the requests should be marked as potentially compromised. For example, the frequency of use of passwords associated with the plurality of accounts may represent a normal distribution of passwords utilized for the accounts. The indication that a particular password or piece of authentication information has displaced the normal distribution or surpassed the frequency of use for a commonly used password associated with the plurality of accounts in a short time period could represent that an account has been compromised as a subset of accounts are having their passwords set to the particular password within the short time period. The frequency of use information may be maintained and updated by the service. An indication that a password has displaced the normal distribution of passwords or surpassed the frequency of use for a commonly used password could be an indication that a password set request is intended for fraudulent purposes, and the system can utilize this information accordingly (e.g., require authentication on next access). The service may mark an accounts as being potentially compromised based on a comparison of the password included in the set request and a subset of passwords included in the frequency of use information.

In embodiments, the frequency of use information for passwords is maintained separately from the data stores maintaining the passwords for the accounts. Segregating these two data stores ensures an extra level of security for the accounts, because the frequency of use information may not maintain any information about the users who could potentially share the same compromised password.

In a non-limiting example, the password fraud detection service may maintain frequency of use information for passwords associated with a plurality of accounts. Further, the service may receive a request to set a password for a user's account to the password "@@45p." The service may compare the password "@@45p" to the passwords included in the frequency of use information. If the service determines that the frequency of use of the password has surpassed the frequency of use of at least one password included in the frequency of use information for the plurality of accounts, the service may flag the user's account as potentially being compromised by a malicious actor, such as malware. Once an account has been flagged, the service may perform due diligence security inquiries into the account to aid in a determination that the account has been compromised by a malicious actor. For example, the service may use the flagged account's recent purchase history, changes in personal information, such as adding additional shipping addresses, and browsing history to determine if the account is compromised. Upon a determination that the account is compromised, the service may require the user provide an answer to an account question or correctly fill in a provided CAPTCHA (completely automated public turing test to tell computers and humans apart) to have access to the account. The requirement of providing an answer to an account question or CAPTCHA may prevent further action by the compromising entity as a virus or computer based compromising actor will be unable to answer either the CAPTCHA or the account question and a human compromising actor will be unable to answer the account question.

In accordance with at least one embodiment, the determination of whether to mark the account as potentially being compromised may have a temporal aspect. For example, the frequency of use information may be updated according to a specified time period. The time period may be dynamically updated by the service according to the type of account that is associated with the service. In an embodiment, a different time period may exist for accounts associated with a service that utilizes a user's monetary information, such as bank account information or credit/debit card information, than for accounts associated with a service that utilizes a user's contact information such as their email address. The behavior of the service associated with the account and password may also be utilized to update the frequency of use information. For example, if the service's volume of transactions for password set requests is thousands per minute, a ten second time period or threshold may be appropriate, whereas if a service's volume of transactions includes only a thousand per day, a ten second time period for updating or determining the frequency of use of passwords may not be appropriate.

The password fraud detection service may utilize the behavior of the service associated with the accounts and passwords to specify and update the time periods described herein. In accordance with at least one embodiment, the password fraud detection service may compare a password included in a set request to a password that is quickly increasing in frequency of use to flag the associated account as potentially being compromised. The speed or rate at which the password in question is increasing in frequency of use may also be used by the password fraud detection service to flag the account as being potentially compromised. The behavior of the service associated with the frequency of use information may also be a factor in determining which rate or speed of increasing use warrants flagging an account as potentially being compromised. The password fraud detection service may also utilize the dynamically updated frequency of use information for passwords to take retroactive action for accounts that have set their password to a password that at the time was not considered to be an indicator of a compromised account but after a certain time period is considered to be an indicator of a compromised account (such as the password's frequency of use dramatically increasing within a time period). As described herein, the retroactive action may include marking or flagging the account as compromised, and requiring that during the next login session associated with the flagged account that the user provide user verification information such as a phone number or an answer to a security question.

In accordance with at least one embodiment, an authentication information management application may maintain authentication information for an account, a network document, or any suitable authentication information associated with a login request/session including verification information on behalf of a user. The authentication information management application may be configured to run locally on a client device on behalf of a user and generate, store, and maintain authentication information for login requests made by the user. In an embodiment, the authentication information management application may be configured to receive or obtain other authentication information that has been marked as potentially compromised. For example, a password fraud detection service that implements a password fraud detection module 432 (FIG. 4), as described herein, may provide a set of one or more passwords or other types of authentication information that has been marked as potentially compromised. The password fraud detection service or other providers of potentially compromised authentication information may also provide or be queried for authentication information scope rules which indicate minimum and maximum rules for setting passwords or authentication information (such as character limitations, or supported symbol sets). In response to receiving or obtaining the potentially compromised authentication information, the authentication information management feature may take several actions including at least generating a recommendation that the user change/update their authentication information for one or more accounts, automatically update the user's authentication information for one or more accounts, or automatically update the user's authentication information for one or more accounts and notify the user of the update.

In an embodiment, an authentication information clearinghouse service that implements an authentication information clearinghouse feature may manage compromised authentication information for one or more accounts on behalf of a user, share and receive other authentication information maintained by peer members of a compromised authentication information clearinghouse, and update the authentication information for the one or more accounts based on the authentication information that is shared and received by the password fraud detection service. In accordance with at least one embodiment, an authentication information peer network may be comprised of members that each maintain compromised authentication information for a plurality of accounts associated with each member. Each member of the authentication information peer network may maintain metadata associated with the compromised authentication information such as how the authentication information is utilized (creating new accounts, being set after compromise has occurred, etc.), or authentication information structure. In an embodiment, an authentication information clearinghouse service that implements an authentication information clearinghouse module may determine patterns or characteristics of compromise based on the metadata that can be utilized to generate recommendations for updating authentication information for one or more of the accounts associated with each member.

In accordance with at least one embodiment, the password fraud detection feature may determine and generate frequency of use information for authentication information associated with a plurality of accounts, utilize the frequency of use information to determine whether an account should be marked as compromised, and take further action based on whether the account is marked as compromised, such as implementing security mechanisms as described herein. The frequency of use information or potentially compromised authentication information may be provided to an authentication information management application that maintains authentication information for an account on behalf of a user. The authentication information management application may utilize the received potentially compromised authentication information to take several actions to ensure security of authentication information maintained on behalf of the user. For example, the authentication information management application may automatically updating authentication information on behalf of the user when the maintained authentication information is similar to authentication information that has been marked as potentially compromised. The password fraud detection feature may also provide the potentially compromised authentication information to an authentication information clearinghouse service that includes one or more authentication information peer network members. Each member may utilize the potentially compromised authentication information to update accounts maintained by the member and for sharing their own collected potentially compromised authentication information with other peer members.

FIG. 1 is a block diagram that illustrates an example of a password fraud detection feature. In accordance with at least one embodiment, the password fraud detection feature may be implemented by a password fraud detection module 100 within an electronic marketplace 102. The password fraud detection module 100 may be implemented as hardware, software, or a combination of software and hardware to perform the functions described herein. In an embodiment, the password fraud detection module 100 may maintain frequency of use information for passwords 104 corresponding to accounts associated with the electronic marketplace 102 separate from a password data store 106. The password data store 106 may store and maintain hashed passwords for accounts of users associated with the electronic marketplace 102. In FIG. 1, the frequency of use information for passwords 104 includes three passwords that are frequently used by accounts associated with the electronic marketplace: password, 1234, and "Open Sesame." Although the frequency of use information for passwords 104 included in FIG. 1 only illustrates three ranked passwords, the password fraud detection feature described herein may implement a varied subset of ranked passwords for use in comparing to a password set request described herein.

In accordance with at least one embodiment, a user's account, account A 108 may request to set the password 110, which may be a change password request or a request to set up an account for the first time, associated with account A 108. The password fraud detection module 100 may receive the request to set the password 110 via a network 112. As described herein, the password fraud detection module 100 may compare the password included in the request to set the password 110 to the passwords included in the frequency of use information 104 to determine if the account A 108 should be marked as potentially compromised.

In FIG. 1, the password included in the request 110 may have been "Open Sesame." The frequency of use of the password "Open Sesame" may have recently surpassed the frequency of use of another password (not pictured) maintained in the frequency of use information 104. Based on the "Open Sesame" password included in the request 110 being the same or similar to a password that has surpassed the frequency of use information that is normally associated with the plurality of accounts, the password fraud detection module 100 may mark or provide instructions to mark account A 114 as potentially being compromised. In some embodiments, if the frequency of use information for password included in the request 110 was not abnormal compared to the normal distribution of passwords or did not surpass the frequency of use for passwords 104 for the plurality of accounts, the password fraud detection module 100 will not mark the account 108 as potentially compromised. However, the password fraud detection module 100 may update the frequency of use information for passwords 104 based on all incoming password set requests and the password accepted at this time point may be determined at a later time to be an indication that a malicious actor has compromised account A 108 and other accounts, and is rapidly changing the passwords on multiple accounts to the same or similar password. Additionally, the password fraud detection component 100 may maintain time stamp information indicating when an account's password was changed for retroactive action as described herein.

Figure 2:
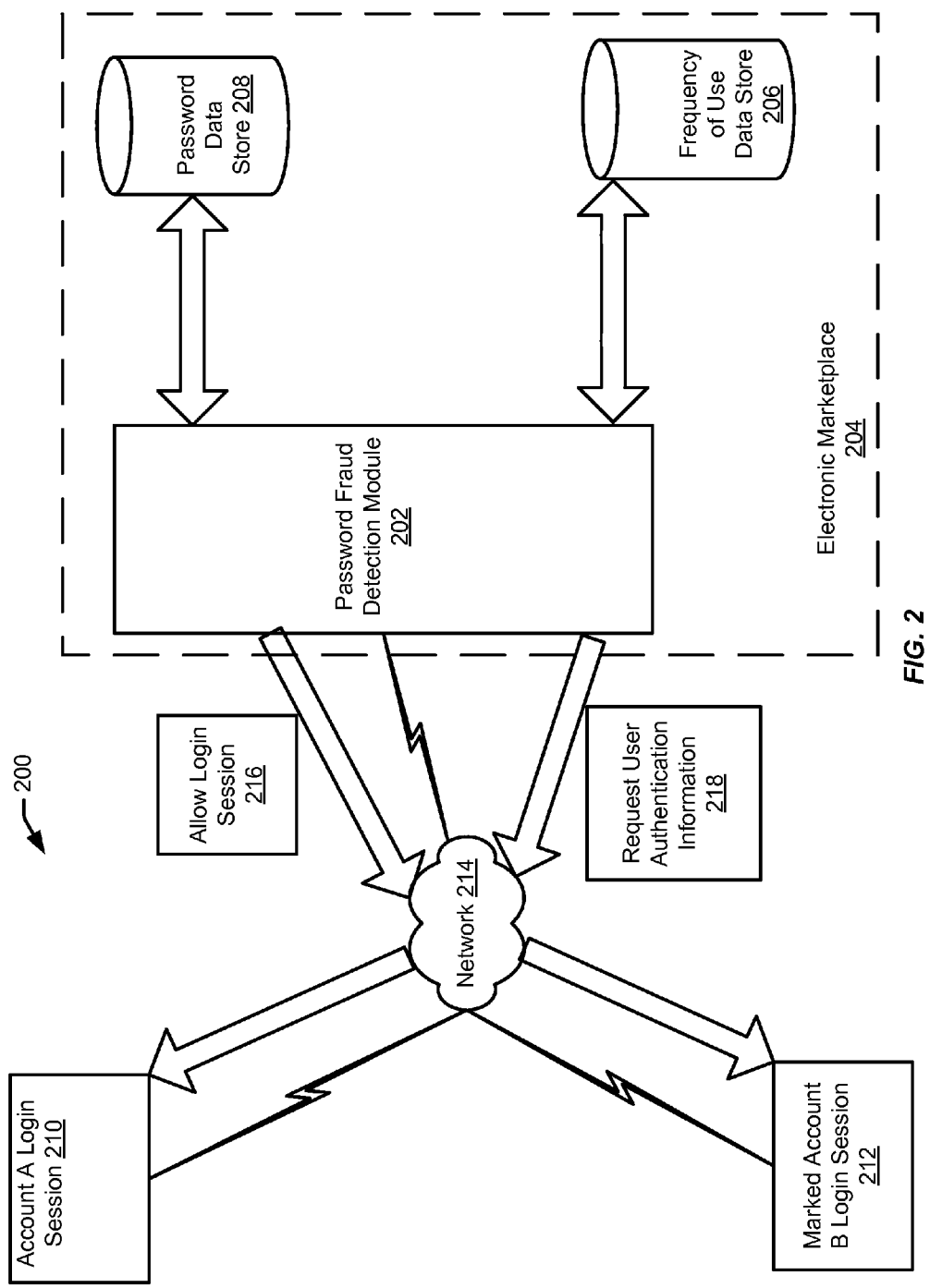
FIG. 2 is a block diagram that illustrates an example of a password fraud detection feature in accordance with at least one embodiment.

FIG. 2 is a block diagram 200 that illustrates another example of a password fraud detection feature. FIG. 2 includes a password fraud detection module 202 (which may be an example of password fraud detection module 100 from FIG. 1), that may implement the password fraud detection feature described herein, implemented within an electronic marketplace 204. The password fraud detection module 202 may be implemented as hardware, software, or a combination of software and hardware to perform the functions described herein. In accordance with at least one embodiment, the password fraud detection module 202 may be configured to process multiple password set requests for a plurality of accounts. The password fraud detection module 202 may maintain frequency of use information for passwords in a data store 206 (which may be an example of the frequency of use information for passwords 104 from FIG.

1) separately from a maintained password data store 208 (which may be an example of password data store 106 from FIG. 1). The password data store 208 may maintain the passwords for user accounts associated with the electronic marketplace 204.

FIG. 2 illustrates two login session requests, account A login session 210 and marked account B login session 212 received via a network 214. As described herein, marked account B 212 may have been marked in response to the password fraud detection module 202 receiving a password set request including a password that is similar to a password whose frequency of use has recently surpassed the frequency of use of passwords normally maintained in data store 206. The password included in the request whose frequency of use has surpassed the frequency of use of passwords normally associated with the accounts can be an indication that the password is being utilized by a malicious actor who has compromised a number of accounts. In an embodiment, the frequency of use data store 206 may maintain a normal distribution of passwords normally utilized for accounts and any password that displaces or changes the normal distribution may be an indication that accounts utilizing that password are potentially compromised by a malicious actor that is setting passwords for one or more accounts. In accordance with at least one embodiment, the password fraud detection module 202 may allow or provide instructions to allow the login session 216 for account A 210 as account A 210 is not marked as being potentially compromised by a malicious actor. The allow login session instruction 216 may be provided via network 214 to account A login session 210. In comparison, marked account B login session 212 may receive an instruction or request for user authentication information 218 from the password fraud detection module 202. In an embodiment, the marked account B login session 212 may be allowed in order for the password fraud detection service (that implements the password fraud detection features described herein) to take further security steps or to further analyze the marked account associated with the marked account B login session 212. For example, the service may restrict access to sensitive operations associated with the account, such as allowing the browsing of an item catalog in an electronic marketplace but restricting access to payment information or prohibiting the ordering of items with the marked account. In some embodiments, the marked account B login session 212 may be passed or communicated to an intrusion response system that includes a session that looks real to the malicious attacker but is actually designed to gather information about the malicious attacker so that they can be identified. For example, any data or information provided during the intrusion response system session may be tagged for subsequent tracking purposes. In an embodiment, the service may send an alert to another entity, such as a security entity associated with the account that corresponds to the marked account B login session 212 for further action, such as contacting the account holder. In accordance with at least one embodiment, the password fraud detection module 202 may maintain multiple thresholds that correspond to the varying frequency of use information for authentication information. For example, for frequency of use information metrics that indicate an alarming increase in usage that is abnormal from the normal frequency of use distribution for a set of accounts, the threshold may be low indicating the use of all response mechanisms describes herein. Thus, each threshold can be associated with a different response mechanism or combination of response mechanisms described herein.

Thus, the password fraud detection feature described herein may provide increased security for passwords as the actor attempting to login with the marked account must provide user authentication information before the login session is allowed by the password fraud detection module 202. As described herein, the password fraud detection module 202 may request user authentication information 218, request that the user answer a CAPTCHA, provide an answer to a security question, provide a code included in an email verification, or any other suitable means for determining the user's identity. The further security step of requesting user authentication information may be provided to a user's account that coincidentally changed their password to a password that is suspicious based on the frequency of use information 206. However, upon the user providing the authentication information (218) the user's login session would be allowed. If however, the user's account had been compromised, as predicted by the marking or flagging of the account, the malicious actor may be limited in the actions they may take with the user's account as their login session would be denied until further verification information could be provided.

Figure 3:
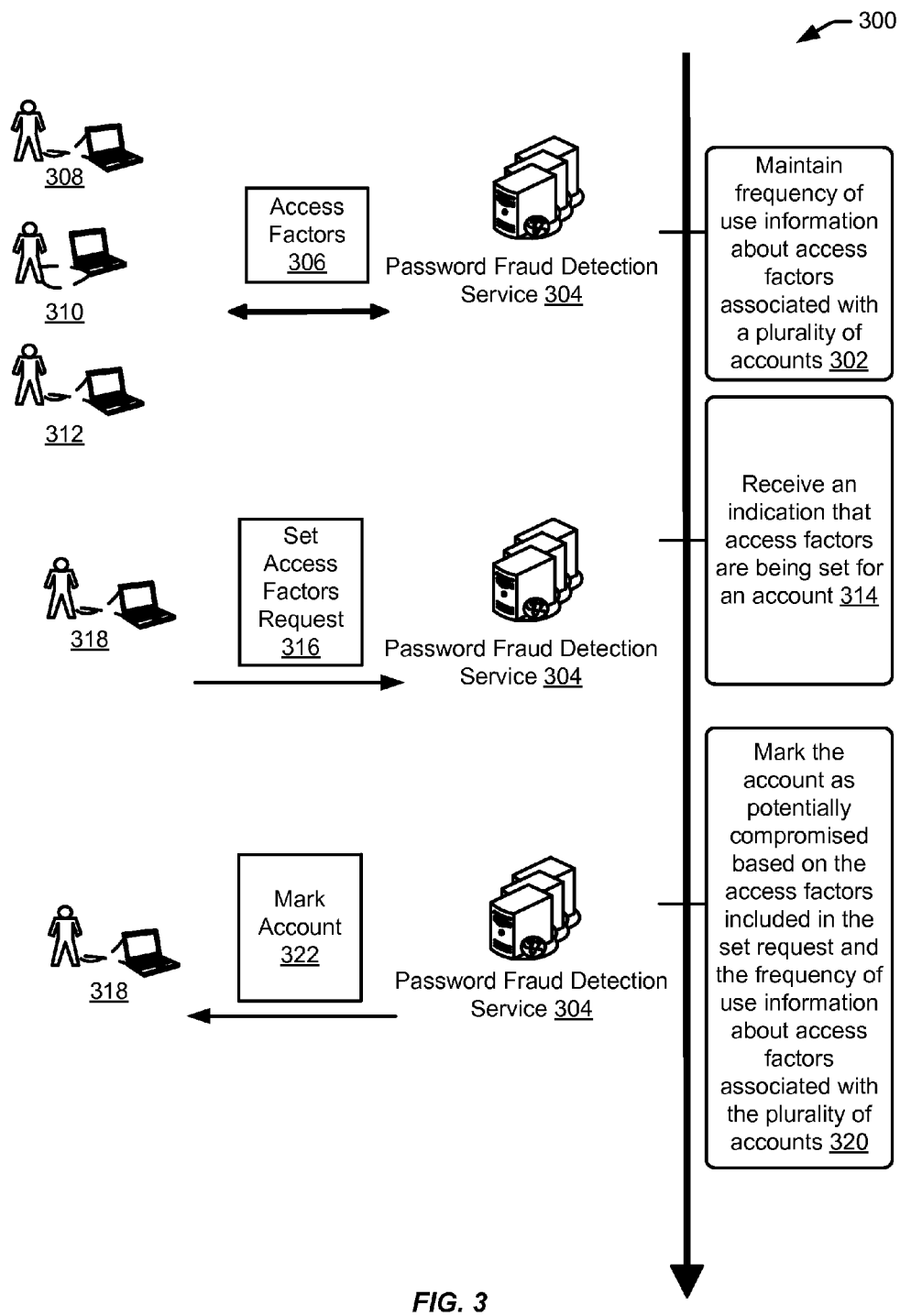
FIG. 3 is an illustrative flow for a password fraud detection feature in accordance with at least one embodiment.

FIG. 3 is an illustrative flow 300 for a password fraud detection feature in accordance with at least one embodiment. The illustrative flow 300 may begin by maintaining frequency of use information about access factors associated with a plurality of accounts at 302. In an embodiment, access factors may include authentication information and password information associated with each account of the plurality of accounts. For example, a password fraud detection service 304 may maintain frequency of use information about access factors 306 from a plurality of users 308-312 associated with a plurality of accounts. The password fraud detection service computers 304 may utilize or be configured to implement the password fraud detection module 100 and 202 from FIGS. 1 and 2. The illustrative flow 300 may continue by receiving an indication that access factors are being set for an account at 314. For example, the password detection fraud service computers 304 may receive a set access factors request 316 from an account 318. The request 316 may be initiated by a malicious actor or the user associated with the account.

The illustrative flow 300 may conclude at 320 by marking the account as potentially compromised based on the access factors included in the set request and the frequency of use information about access factors associated with the plurality of accounts. In an embodiment, the password fraud detection service 304 may compare the access factors included in the set request 316 from account 318 to the frequency of use information maintained. The password fraud detection service 304 may be configured to identify if the access factors included in the set request 316 are included (similar or identical) in a subset of access factors that are exhibiting suspicious behavior (such as access factors that have exhibited an increased frequency of use within a time period or displaced the normal distribution of access factors maintained for the plurality of accounts). A subset can comprise as few as one or as many as all or any size set in between one and all. Based on the identification of access factors that are included in the subset of access factors that are exhibiting suspicious behavior, the password fraud detection service 304 may mark 322 or provide instructions to mark 322 the account 318.

Figure 4:
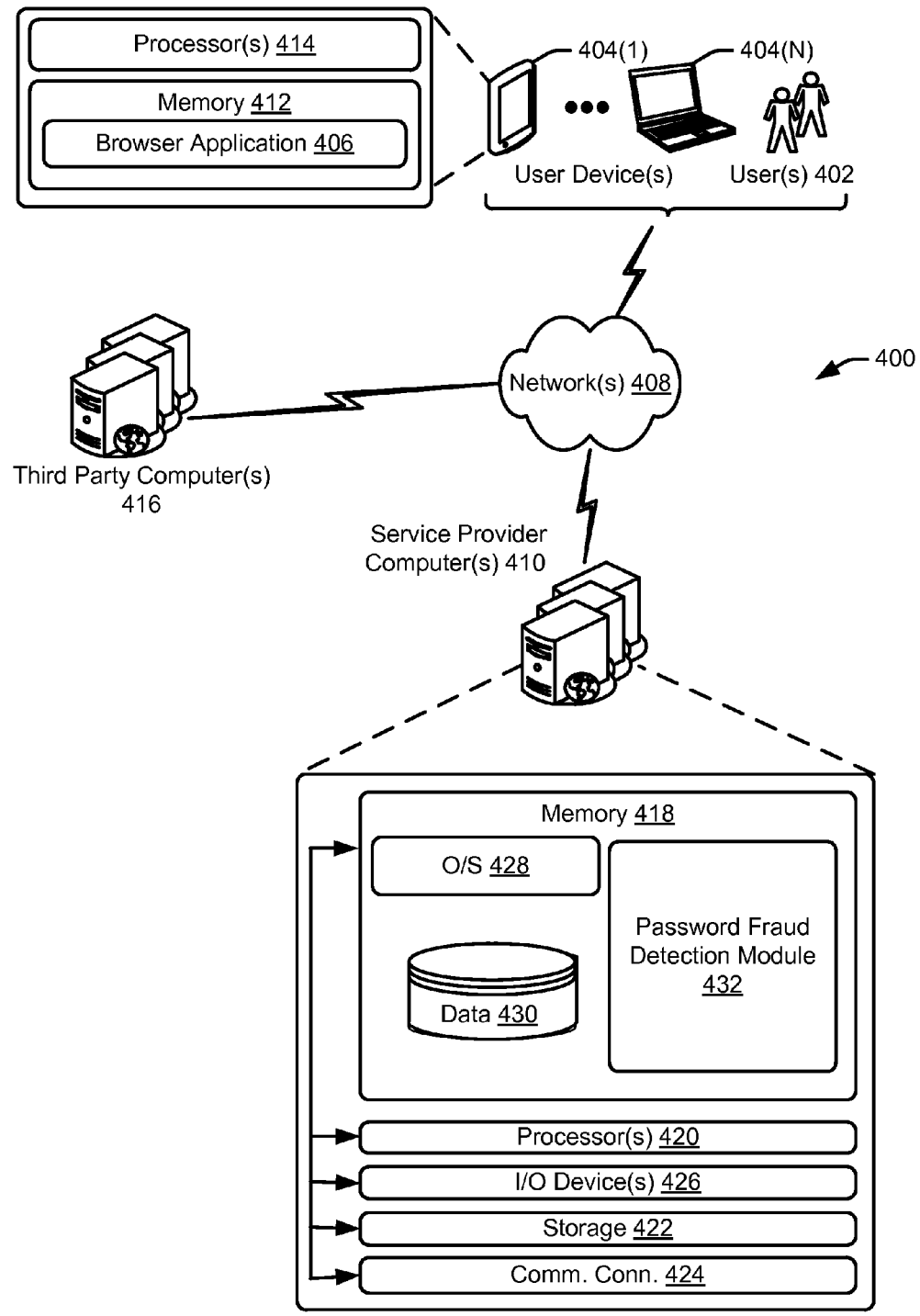
FIG. 4 illustrates an example architecture for a password fraud detection feature as described herein that includes one or more service provider computers and/or a user device connected via one or more networks in accordance with at least one embodiment.

FIG. 4 illustrates an example architecture for a password fraud detection feature as described herein that includes one or more service provider computers and/or a user device connected via one or more networks in accordance with at least one embodiment. In architecture 400, one or more users 402 (such as the user 304 from FIG. 3) may utilize user computing devices 404(1)-(N) (collectively, user devices 404 such as the user 304 utilizing a computing device in FIG. 3) to access a browser application 406 (e.g., a web browser) or a user interface (UI) accessible through the browser application 406, via one or more networks 408 to provide a set password request for an account associated with a password fraud detection feature as described herein. The "browser application" 406 can be any browser control or native application that can access and display a web page or other information. In some embodiments, the user computing device 404 may be configured to receive notifications and provide authentication information requests from the password fraud detection feature as described herein. In some aspects, the browser application 406 may display an interactive UI for providing passwords, answers to security questions, or answers to CAPTCHAs. In some aspects, the browser application 406 may be hosted, managed, and/or provided by a computing resources service or service provider, such as by utilizing one or more service provider computers 410 that are associated with or configured to enable the password fraud detection feature. The one or more service provider computers 410 may, in some examples, provide computing resources such as, but not limited to, client entities, low latency data storage, durable data storage, data access, management, virtualization, cloud-based software solutions, electronic content performance management, etc. The one or more service provider computers 410 may also be operable to provide web hosting, computer application development, and/or implementation platforms, combinations of the foregoing, or the like to the one or more users 402.

In one illustrative configuration, the user computing devices 404 may include at least one memory 412 and one or more processing units or processor(s) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described herein. The user devices 404 may also include geo-location devices (e.g., a global positioning system (GPS) device or the like) for providing and/or recording geographic location information associated with the user devices 404.

The memory 412 may store program instructions that are loadable and executable on the processor(s) 414, as well as data generated during the execution of these programs. Depending on the configuration and type of user device 404, the memory 412 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the components of the memory 412 in more detail, the memory 412 may include an operating system and one or more application programs or services for implementing the features disclosed herein including providing password set requests for an account associated with the password fraud detection service, and for responding to user authentication information requests. The browser application 406 may be configured to provide or display a notification intended for the user 402 via the one or more service provider computers 410 as described herein. Additionally, the memory 412 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 402 provided response to a security question or a geographic location obtained by the user device 404.

In some examples, the networks 408 may include any one or a combination of many different types of networks, such as cable networks, the Internet, wireless networks, cellular networks and other private and/or public networks. While the illustrated example represents the users 402 accessing the browser application 406 over the networks 408, the described techniques may equally apply in instances where the users 402 interact with the one or more service provider computers 410 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 406 may allow the users 402 to interact with an account provided by the one or more service provider computers 410 for and triggering the password fraud detection feature as describe herein. The one or more service provider computers 410, perhaps arranged in a cluster of servers or as a server farm, may host the browser application 406 and/or cloud-based software services. Other server architectures may also be used to host the browser application 406 and/or cloud-based software services. The browser application 406 may be capable of handling requests from many users 402 and serving, in response, various user interfaces that can be rendered at the user devices 404 such as, but not limited to, a website or web page. The browser application 406 can interact with any type of website that supports user interaction, including social networking sites, electronic retailers, informational sites, blog sites, search engine sites, news and entertainment sites, and so forth. The described techniques can similarly be implemented outside of the browser application 406, such as with other applications running on the user device 404.

The one or more service provider computers 410 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 410 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 410 may be in communication with the user device 404 via the networks 408, or via other network connections. The one or more service provider computers 410 may include one or more servers, perhaps arranged in a cluster or as individual servers not associated with one another. The one or more service provider computers 410 may be in communication with one or more third party computers 416 via networks 408. The one or more service provider computers 410 that host the browser application 406 may obtain and provide data to third party computers 416 via networks 408 in accordance with embodiments described herein. The one or more third party computers 416 may be provided information about the ranked list of popular passwords for determining if accounts associated with third parties are potentially compromised. For example, the service provider computers 410 may provide or communicate a subset of passwords included in the maintained frequency of use information for the plurality of accounts to a third party account service to obtain further information regarding potentially compromised accounts or to prevent trends by malware or botnets that are cracking passwords associated with online accounts.

In one illustrative configuration, the one or more service provider computers 410 may include at least one memory 418 and one or more processing units or processors(s) 420. The processor(s) 420 may be implemented as appropriate in hardware, computer-executable instructions, firmware, or combinations thereof. Computer-executable instruction or firmware implementations of the processor(s) 420 may include computer-executable or machine-executable instructions written in any suitable programming language to perform the various functions described. The memory 418 may store program instructions that are loadable and executable on the processor(s) 420, as well as data generated during the execution of these programs. Depending on the configuration and type of the one or more service provider computers 410, the memory 418 may be volatile (such as RAM) and/or non-volatile (such as ROM, flash memory, etc.). The one or more service provider computers 410 or servers may also include additional storage 422, which may include removable storage and/or non-removable storage. The additional storage 422 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 418 may include multiple different types of memory, such as SRAM, DRAM, or ROM.

The memory 418, the additional storage 422, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 418 and the additional storage 422 are all examples of computer storage media. Additional types of computer storage media that may be present in the one or more service provider computers 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 410. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 410 may also contain communication connection(s) 424 that allow the one or more service provider computers 410 to communicate with a stored database, another computing device or server, user terminals and/or other devices on the networks 408. The one or more service provider computers 410 may also include I/O device(s) 426, such as a keyboard, a mouse, a pen, a voice input device, a touch input device, a display, speakers, a printer, etc.

Turning to the contents of the memory 418 in more detail and as will be described in further detail in FIG. 5, the memory 418 may include an operating system 428, one or more data stores 430, and/or one or more application programs or services for implementing the features disclosed herein including a password fraud detection module 432. The password fraud detection module 432 may be an example of the password fraud detection module 100 and 202 from FIGS. 1 and 2. Further, the service provider computers 410 may be enabled to utilize the password fraud detection module 432 to implement the password fraud detection features described herein, such as the password fraud detection service computers 304 from FIG. 3. In accordance with at least one embodiment, the password fraud detection module 432 may be configured to receive password set requests, compare the password included in the request to a subset of passwords included in frequency of use information about passwords, mark the account associated with the request as being potentially compromised based on the comparison of the password to the subset of passwords, and provide instructions for requesting user authentication information before granting access to any subsequent login sessions associated with the account as described herein. In accordance with at least one embodiment, the password fraud detection module 432 may be configured to provide the frequency of use information to an authentication information management feature or application. The frequency of use information can include the frequency of use for authentication information associated with a plurality of accounts and indicate potentially compromised accounts. The authentication information management feature may utilize the frequency of use information to automatically update/change authentication information for a particular user, generate and provide a recommendation that the user update the authentication information associated with a particular account, or update the authentication information on behalf of the user for an account and notify the user of the update. In accordance with at least one embodiment, the frequency of use information may be provided to one or more peer members of a compromised authentication information clearinghouse. An authentication information clearinghouse service that receives or obtains the frequency of use information from the password fraud detection module 432 may determine patterns associated with the frequency of use information for generating recommendations for updating authentication for one or more accounts associated with each member of the peer members.

Figure 5:
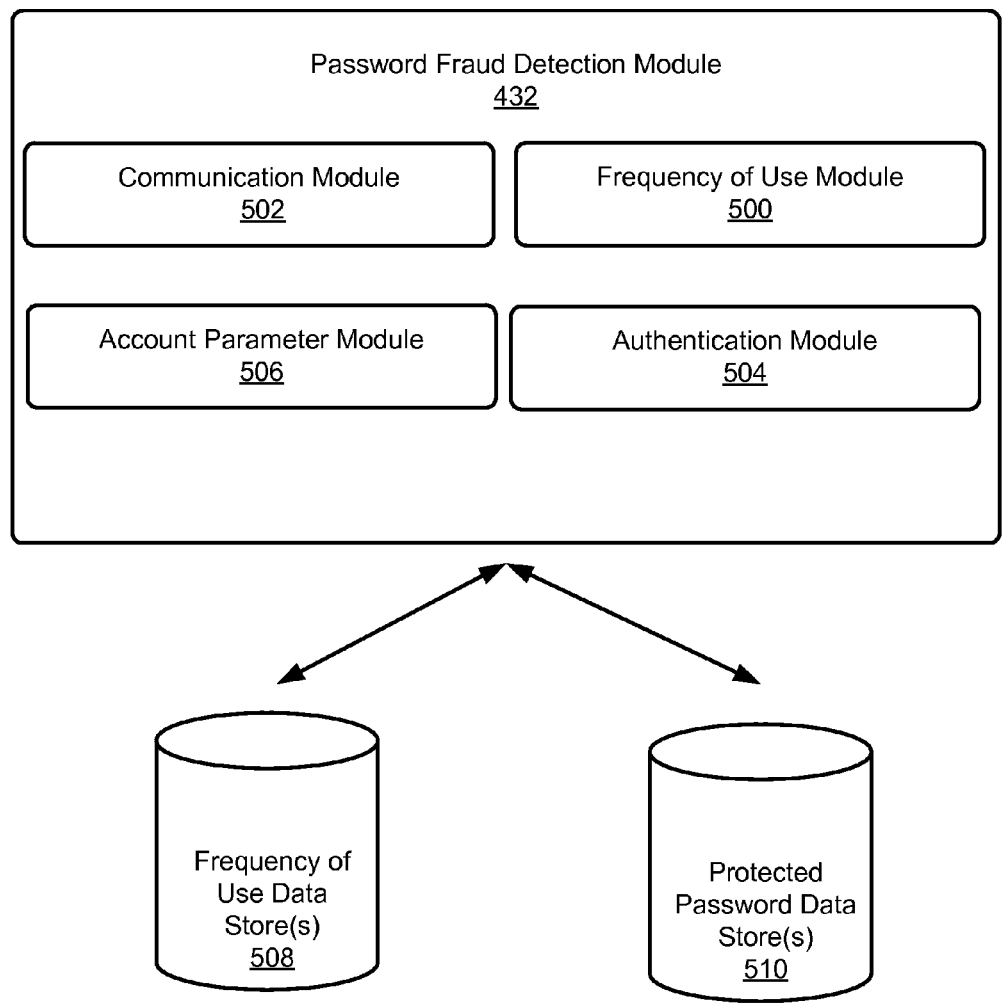
FIG. 5 is a schematic diagram that illustrates an example of a password fraud detection module and associated data stores in accordance with at least one embodiment.

FIG. 5 is a schematic diagram that illustrates an example of a password fraud detection module and associated data stores in accordance with at least one embodiment. It should be noted that while multiple modules are described in the example password fraud detection module 432, the processes and methods described herein can be performed by more or less modules within memory such as memory 418 described above. In addition, while the modules 500-506 included in password fraud detection module 432 are displayed and described as distinct modules, in some embodiments they may be included within one another to further facilitate methods and systems described herein. In accordance with at least one embodiment, the password fraud detection module 432 may include a frequency of use module 500, a communication module 502, an authentication module 504, and an account parameter module 506 in communication with one or more data stores 508 and 510 (which may be an example of the one or more data stores 430 from FIG. 4).

In accordance with at least one embodiment, the frequency of use module 500 may be configured to determine and maintain frequency of use information for passwords associated with a plurality of accounts that utilize the password fraud detection service as described herein. The frequency of use module 500 may keep a running tally or scoreboard of frequency of use information for passwords that are being set by a user for accounts associated with the password fraud detection feature. The frequency of use module 500 may maintain and update the frequency of use information for passwords within a data store, such as the data store 508 separate from a data store for the actual password-account information stored in data store 510. The separation of the data stores (e.g., storing different information on different storage devices) strengthens the security of the protected password data store 510 as the password fraud detection feature described herein may not need to crack or transform the hashes or protected state of the password-account information stored in data store 510 in order to determine the frequency of use information for passwords associated with the accounts.

In accordance with at least one embodiment, the frequency of use module 500 may be configured to dynamically determine a subset of passwords for comparison to the password included in the set request for an account. For example, if the password fraud detection feature is determining whether to flag an account as being potentially compromised, the subset of passwords utilized for comparison to the password in question may need to be more inclusive depending on the information gained by accessing the account associated with the password in question, or based on the nature of the online activity or web service attached to the account. This may capture more false positives (password set requests from users that coincidentally pick a password with abnormally increased frequency of use) but ensures a higher security standard for more sensitive information by lowering the threshold required before an account is marked as potentially compromised. If a larger subset is utilized for comparison to the password included in the set request than more accounts may be marked as potentially compromised as do the odds of capturing coincidental changes to a password as opposed to password set requests that are originated by a malicious actor thus maintain a higher security standard. The larger subsets may be utilized for more sensitive information such as payment or shipping information. The opposite may be true as well. For example, the subset utilized for comparison may be less inclusive (for example, a subset of three or fewer passwords based on the frequency of use information) when dealing with a service or account that does not protect as sensitive information such as contact information or user preferences. The frequency of use module 500 may be configured to determine the subset utilized in comparison for determining whether to mark an account as potentially being compromised using any of the above mentioned methods in any combination. Further, the size of the subset to utilize for comparison may be specified by receiving input from an administrator associated with the password fraud detection feature/service.

In accordance with at least one embodiment, the frequency of use module 500 may be configured to dynamically determine the time period or threshold utilized for updating the frequency of use information for passwords. For example, the time period may be dynamically updated by the frequency of use module 500 according to the type of account associated with the password fraud detection feature. In an embodiment, a different time period may exist for accounts associated with a service that utilizes a user's monetary information, such as bank account information or credit/debit card information, then for accounts associated with a service that utilizes a user's contact information such as their email address, the type of account may be obtained and maintained by the account parameter module 506. In some embodiments, the frequency of use module 500 may have the time period specified by an administrator associated with the password fraud detection service described herein. In accordance with at least one embodiment, the determined time period may be utilized to update the frequency of use information for passwords and for updating the subset of passwords utilized for comparison to a password included in a set request to determine if the associated account should be flagged as being compromised.

In accordance with at least one embodiment, the account parameter module 506 may also keep track of statistics or metrics associated with the maintained frequency of use information for passwords. For example, the account parameter module 506 may maintain information such as the most frequently used password for a plurality of accounts, the least frequently used password for a plurality of accounts, a list of frequently used passwords since the creation of the accounts, the speed or rate at which each password is gaining in frequency of use, total number of unique passwords for the accounts, or any other suitable metrics that may be obtained from a plurality of passwords maintained for accounts. In an embodiment, the password fraud detection module 432 may utilize the metrics associated with the maintained frequency of use information for passwords for determining whether an account associated with a set request is potentially compromised. For example, in addition to comparing the password included in the set request to a subset of passwords included in the frequency of use information for passwords, the password may also be compared to one or more passwords that are quickly gaining in frequency of use or displaying an abnormal distribution across the accounts. In an embodiment, a threshold speed or rate of increased frequency of use (for example going from not being used at all to being used for 100 accounts within milliseconds) may be utilized to determine the one or more passwords maintained in the frequency of use information for use in comparison to the password included in the set request to further determine if an account is potentially compromised.

In accordance with at least one embodiment, the frequency of use module 500 may utilize security measures to protect the frequency of use information for passwords maintained on the data store 508. In some embodiments, each entry included in the frequency of use information for passwords may be protected by a hashing and salting function as described "Protecting Customer Secrets with a Trusted Execution Environment," application Ser. No. 13/606,635 which is hereby incorporated by reference. Further, encryption methods may be utilized during the hashing function of each entry by utilizing encryption within a trusted execution environment such as a hardware security module prior to storing the entry as described in application Ser. No. 13/606,635. In an embodiment, each entry in the frequency of use information for passwords may be protected by decryption within the hardware security module along with token assignment and re-encryption within the hardware security module as described in "Hardening Tokenization Security and Key Rotation," application Ser. No. 12/242,746 which is hereby incorporated by reference. Utilizing decryption within a hardware security module as described in application Ser. No. 12/242,746 can ensure transformation to a clear text which may aid in the determination of whether the password included in the set request is similar to a password included in the subset of popular passwords as described herein. Additionally, the token may describe the type of data the clear text embodies, such as a password for a specific account. Each entry in the frequency of use information for passwords may also be protected by utilizing any suitable one way function encryption. In an embodiment, additional security measures may be employed for each data store including data store 508 which aids in maintaining the frequency of use information for passwords.

In accordance with at least one embodiment, the password fraud detection module 432 may be configured to compare the password included in the set request to a subset of passwords included in the frequency of use information for passwords to determine if an account should be marked/flagged as potentially compromised. In some embodiments, the password included in the set request may be an exact match to a password included in the subset before a flag instruction is provided. In accordance with at least one embodiment, different comparison variations may be utilized to determine if the password included in the set request is similar to a password included in the subset or among the passwords that are quickly gaining in frequency of use for accounts. For example, a string comparison may be utilized to compare passwords for similarity with different thresholds of similarity triggering the determination to flag an account. The thresholds of similarity can be determined by the frequency of use module 500 using similar attributes as described above (behavior of services, nature of transactions, etc.) determined by the account parameter module 506. A logical exclusive OR operation can be utilized for comparing the passwords to determine similarity.

Approximation techniques may also be utilized to determine similarity. For example, the password fraud detection module 432 may utilize a percentage sub-string match to determine out of N characters, how many are similar. The nature of the service, the information protected by the account in question, or other suitable factors may be utilized to determine the percentage of similar characters between the passwords to determine similarity and flag an account as compromised as maintained by the account parameter module 506. In accordance with at least one embodiment, the password fraud detection module 432 may communicate (via the communication module 502) with an electronic marketplace or with the service hosting the account in question to obtain information about the account to aid in determining whether to flag an account as potentially compromised. For example, if a fifty percent match occurs during a sub-string comparison, the password fraud detection module 432 may attempt to obtain additional information about the account, such as recent purchases that are not similar to other purchases for the account, changes or additions in shipping information, as an additional factor in determining whether the account should be flagged as potentially compromised.

Any suitable percentage of sub-string match may be utilized in the present disclosure before additional account information may be obtained for determining whether to flag an account as compromised or not. For example, depending on the nature of the account, any percentage greater than zero may trigger the password fraud detection module 432 obtaining additional account information to utilize in its determination of whether to flag an account for further investigation. The password fraud detection module 432 may compare the password included in the set request to a subset of passwords included in the frequency of use information for passwords for similarity or exact match, as described above, to determine whether to flag an account as potentially compromised. If the password included in the set request is similar/exact to a password included in the subset (or to a password that is quickly gaining in frequency of use) the account may be flagged as potentially compromised and further actions may be taken before the account may be accessed and utilized. In accordance with at least one embodiment, the password fraud detection module 432 may generate and provide a notification indicating that the account has been marked as potentially being compromised. The notification may be provided to the account via the communication module 502 and may take the form of an email, a short message service (SMS) text message, an application driven message (such as a message provided via the service that the account is associated with), or any other suitable digital communication channel.

In accordance with at least one embodiment, the communication module 502 and the authentication module 504 may be configured to implement security measures or account verifications necessary before an account can be utilized or accessed after it has been flagged. The authentication module 504 may be configured to request user authentication from an account that is attempting to change the password for a flagged account or login in utilizing a flagged account. For example, the authentication module 504 may generate and provide CAPTCHAs, verification emails, security questions, or use any suitable verification techniques before access to the account or updates to the account may be granted for a flagged account. The communication module 502 may aid the authentication module 504 in providing and receiving input regarding the user authentication information.

In accordance with at least one embodiment, the password fraud detection module 432 may provide password fraud detection for accounts that had their password changed to a password included in the frequency of use information for passwords, maintained by module 500, before the password was included in a subset of password that are potentially compromised based on their frequency of use. This feature can help capture accounts that were compromised and had their password set to a password that at the time was not popular enough to warrant flagging the account as potentially compromised but later on would share a password with the a password that is exhibiting increased frequency of use that is abnormal or reflects an abnormal distribution of usage when compared to the usual distribution of passwords associated with the accounts. The password fraud detection module 432 may be configured for determining and assigning a score for a password during a set request. The score may be based on a comparison of the password included in the request to the current frequency of use information for passwords maintained by module 500. The score or security score may reflect the strength of the password included in the request given the information obtained from the frequency of use information for passwords associated with a plurality of accounts. For example, a low security score may reflect that the password included in the request is not unique and an exact match to, or similar to, a password exhibiting unusual increased frequency of use as determined by the frequency of use module 500. On the other hand, a high security score may reflect that the password is unique and not similar to any passwords included in the frequency of use information for passwords.

As described above, the score may be calculated each time a user sets a password associated with an account that utilizes the password fraud detection feature described herein. Additionally, the score may be updated based on the dynamic nature of the frequency of use information for passwords. This can help capture passwords that during initial account creation do not indicate a compromised account but after more information is obtained from other accounts, the password would indicate that the account may be compromised. The password fraud detection module 432 may utilize the score and a threshold maintained by the frequency of use module 500 to determine that authentication information should be requested and provided before a login session is granted. The score for the password can continually be updated and calculated as the frequency of use information maintained by module 500 is continually being updated. The security score threshold maintained by module 500 may be determined based on the nature of the account, the behavior of the service associated with the account, the sensitivity of the information protected by the account, or any other suitable metric described herein that may be obtained/maintained by account parameter module 506. In accordance with at least one embodiment, the password fraud detection module 432 may randomly assign a new password to an account that has been flagged as potentially compromised. The randomly assigned new password may be communicated to the account holder via various communication channels such as an contact information associated with the account, or via a communication channel that is only maintained by the service itself (not able to be viewed by the account holder themselves or any malicious actor that has gained access to the user's contact information). Various security mechanisms may be implemented with communicating the randomly assigned password to the user to ensure security and privacy such as by requiring further authentication information to gain access to the new password or provide further user information that is not included in the user's contact information (birthdate, social security number, etc.). In an embodiment, the password fraud detection module 432 may randomly assign a new password to an account when the security score exceeds the threshold as described above. The randomly assigned password may also be compared to the frequency of use information for passwords to ensure that a weak password is not proliferated in accounts associated with the password fraud detection feature.

In accordance with at least one embodiment, the communication module 502 may communicate with third party information data stores to obtain passwords or authentication information utilized in services hosted by the third parties. For example, the frequency of use module 500 may update the frequency of use information for passwords by using password/authentication information obtained from third parties. The password/authentication information obtained by the third parties can be used to update the frequency of use information for passwords and authentication information by the frequency of use module 500 utilizing the password/authentication information as additional data points. Similar password/authentication information utilized many times in the third party information may update the frequency of use information for passwords/authentication information maintained by the frequency of use module 500. In accordance with at least one embodiment, a determined subset of passwords included in the frequency of use information for passwords/authentication information may be provided, via the communication module 502, to third parties to aid in determining whether accounts associated with the third parties are potentially compromised. The passwords that are received in the set requests from users may be maintained in a separate data store, such as data store 510, from the frequency of use information maintained in data store 508.

Figure 6:
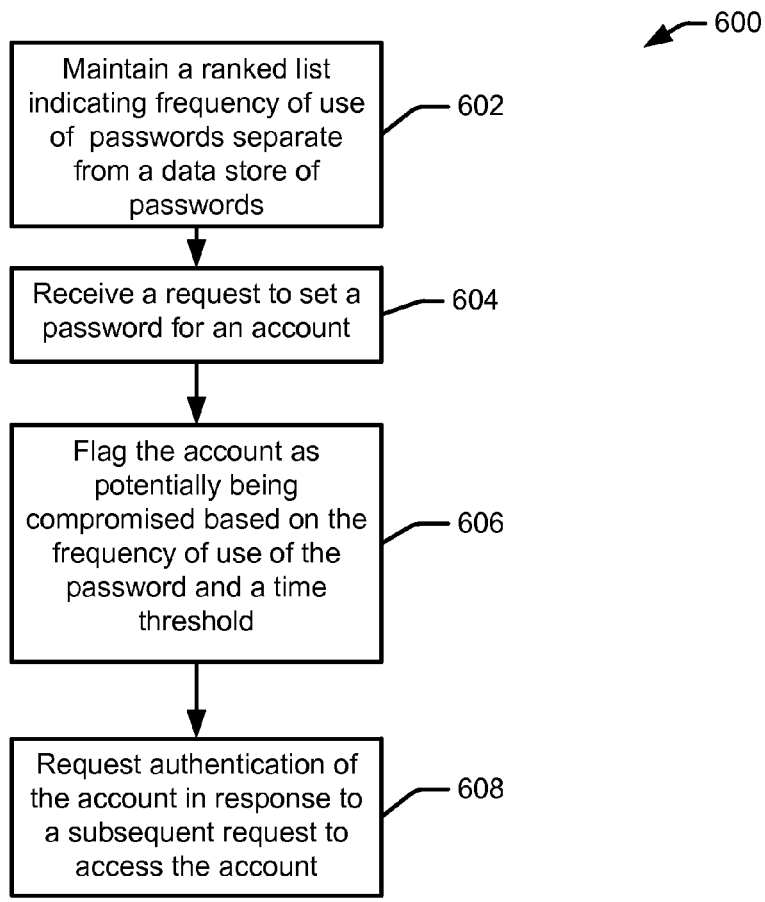
FIG. 6 is a flow diagram of a process for a password fraud detection feature as described herein in accordance with at least one embodiment.

FIG. 6 is a flow diagram of a process for a password fraud detection feature as described herein in accordance with at least one embodiment. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 410 (e.g., utilizing at least one of the password fraud detection module 432, the frequency of use module 500, the communication module 502, the authentication module 504, and the account parameter module 506 in communication with one or more data stores 508 and 510) shown in FIGS. 4 and 5, may perform the process 600 of FIG. 6. In FIG. 6 the process 600 may include maintaining a ranked list indicating frequency of use of passwords separate from a data store of passwords at 602. As described above, the frequency of use information of passwords may be updated according to a time threshold corresponding to the accounts associated with the passwords. The process 600 may include receiving a request to set a password at 604.

The process 600 may include flagging the account associated with the request as potentially being compromised based on the frequency of use of the password included in the request and a time threshold at 606. In accordance with at least one embodiment, the comparison may include an exact match comparison between the password included in the set request to the passwords included in the frequency of use information or a similar match comparison between the same. The process 600 may conclude at 608 by requesting authentication of the account in response to subsequent requests to access the account. In accordance with at least one embodiment, the password fraud detection module 432 may provide a notification, via the communication module 502, to the account associated with the set password request.

Authentication Information Update Based on Fraud Detection

Systems, methods, and computer-readable medium for managing authentication information for one or more accounts on behalf of a user are described herein. In accordance with at least one embodiment, frequency of use information, that may be received or obtained from a password fraud detection service, can include the frequency of use for authentication information associated with a plurality of accounts and indicate potentially compromised accounts. An authentication information management feature, as described herein, may utilize the frequency of use information to automatically update/change authentication information for a particular user, generate and provide a recommendation that the user update the authentication information associated with a particular account, or update the authentication information on behalf of the user for an account and notify the user of the update. For example, the authentication information management feature may utilize the frequency of use information to determine that an account associated with a particular user is utilizing authentication information that has been marked as potentially compromised and thus subject to attack by a malicious actor. The authentication information management feature may take actions, as described herein, to update or alter the authentication information on behalf of the user of the account to ensure security in an efficient manner that reduces the input required by the user and ensures maximum security for the user's accounts.

In accordance with at least one embodiment, the authentication information management feature may be configured to receiving information from a password fraud detection service such as the strength of passwords that are compromised or patterns that are popular among compromised authentication information. In an embodiment, the authentication information management feature may utilize the password strength or authentication information pattern information to automatically update the authentication information of a user or generate a recommendation for a user to update their authentication information where the recommendation may include a new or different pattern than what is trending with compromised authentication information. In an embodiment, the authentication information management feature may be configured to analyze incoming emails or notifications from services associated with accounts of the user and automatically update the authentication information of the user. For example, an online banking service may generate an email including information indicating that they believe their password data store has been compromised. In response to the email, the authentication information management feature may update the password associated with the online banking service account on behalf of the user to maintain security.

Figure 7:
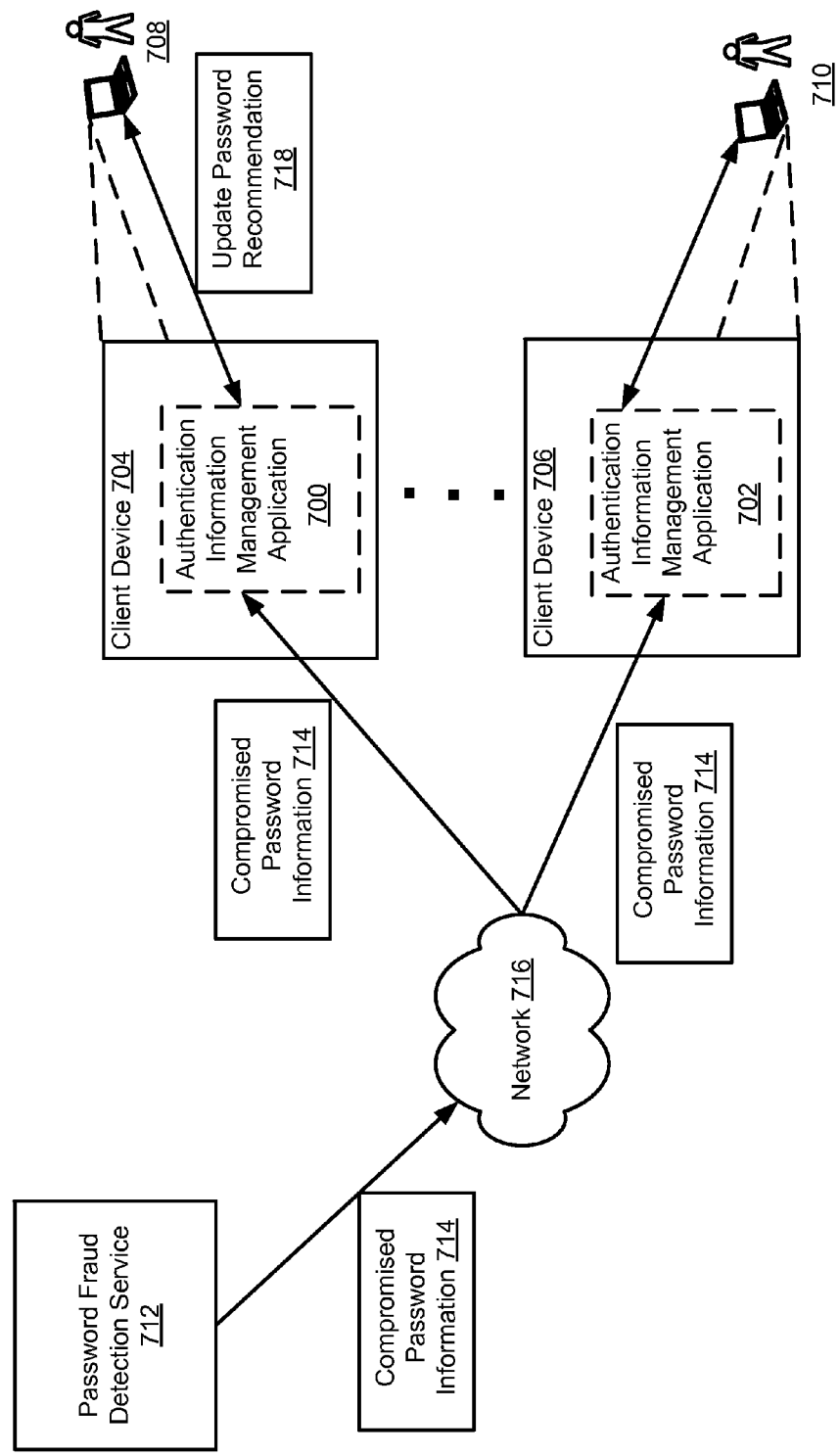
FIG. 7 is a block diagram that illustrates an example of an authentication information management feature in accordance with at least one embodiment.

FIG. 7 is a block diagram that illustrates an example of an authentication information management feature in accordance with at least one embodiment. In an embodiment, the authentication information management feature may be enabled by one or more authentication information management applications 700 and 702 on one or more client devices 704 and 706. The one or more authentication information management applications 700 and 702 may implemented by an authentication information management module (not shown) and the ellipsis between the one or more client devices 704 and 706 indicate that the authentication information management service may support any number (e.g., thousands, millions, and more) of client devices running authentication information management applications although, for clarity, only two are shown. As briefly described above, the one or more authentication information management applications 700 and 702 may maintain authentication information on behalf of users 708 and 710 who may interact with the client devices 704 and 706 to login to one or more accounts or services.

In accordance with at least one embodiment, the authentication information management applications 700 and 702 may be configured to receive/obtain and analyze compromised authentication information. In FIG. 7, a password fraud detection service 712 may generate and provide compromised password information 714 via one or more networks 716 to the authentication information management applications 700 and 702. In some embodiments, the password fraud detection service 712 may generate and provide compromised password information 714 to a peer member of an authentication information peer network group. The compromised password information 714 may be utilized by an authentication information peer network member for updating authentication information or passwords for accounts that are maintained by each member and for sharing among the peer members in the network as described herein. In an embodiment, the compromised password information 714 (which may be an example of the frequency of use information for passwords 104 from FIG. 1) may include a set of one or more passwords that have been marked as potentially compromised according to the password fraud detection service 712 (that may implement a password fraud detection module, such as module 100 from FIG. 1). The password fraud detection service 712 may have marked one or more passwords as potentially compromised in response to the one or more passwords having an alarmingly increased frequency of use for one or more accounts associated with the password fraud detection service 712.

In some embodiments, the compromised password information 714 may include other authentication information such as answers to security questions, account authentication information, password patterns, or any other suitable information for authenticating an account on behalf of a user. In response to receiving the compromised password information 714 the authentication information management applications 700 and 702 may determine or identify if any of the passwords maintained on behalf of users 708 and 710 are included in the set of one or more passwords that are marked as potentially compromised. The authentication information management applications 700 and 702 may utilize a variety of techniques to determine if there is any overlap or similarity between the passwords maintained on behalf of the user and the passwords that have been marked as potentially compromised including at least string similarity, sub-string similarity, hash value comparison, incremental value comparison or any suitable method for comparing authentication information.

The authentication information management applications 700 and 702 may have different policies to apply when determining similarity or overlap between the sets of authentication information. For example, depending on the sensitivity of information protected by the password/account combination, a certain threshold may be utilized when determining similarity/overlap (i.e., for a highly sensitive account such as a bank account the threshold may be very low). The authentication information management feature may access one or more policies determining the similarity thresholds. In accordance with at least one embodiment, in response to identifying or determining similarity between the sets of authentication information, the authentication information management application may generate a recommendation such as an update password recommendation 718 to provide to user 708. In contrast, no action is taken if, for example, authentication information management application 702 identifies no similarities between the passwords maintained on behalf of user 710 and the passwords included in compromised password information 714.

Figure 8:
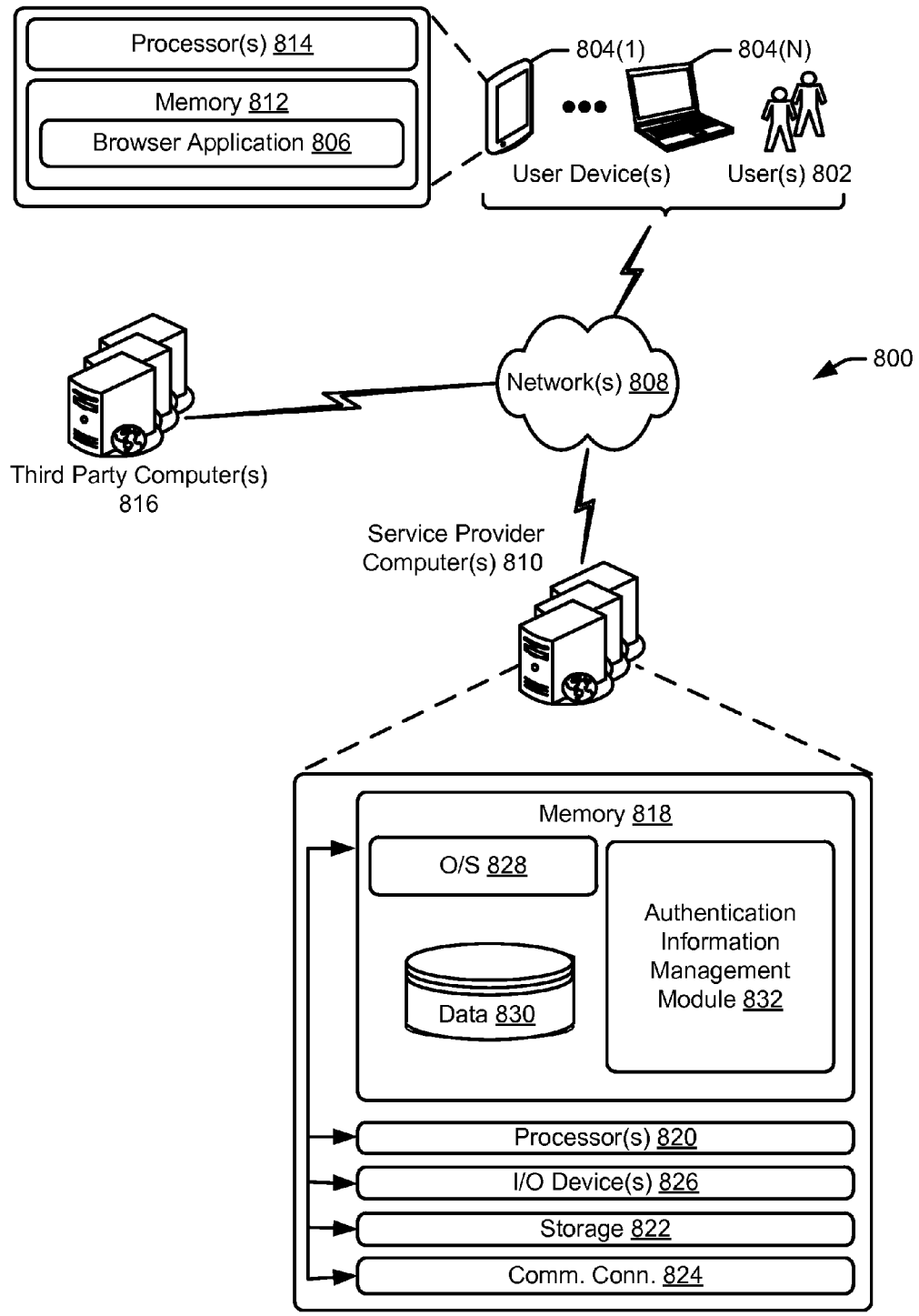
FIG. 8 illustrates an example architecture for implementing an authentication information management feature as described herein that includes one or more service provider computers and/or a user device connected via one or more networks in accordance with at least one embodiment.

FIG. 8 illustrates an example architecture for an authentication information management feature as described herein that includes one or more service provider computers and/or a user device connected via one or more networks in accordance with at least one embodiment. Components in FIG. 8 are similar to components illustrated and described in FIG. 2 above except for the portions described below and are numbered herein accordingly.

Turning to the contents of the memory 818 in more detail and as will be described in further detail in FIG. 9, the memory 818 may include an operating system 828, one or more data stores 830, and/or one or more application programs or services for implementing the features disclosed herein including an authentication information management module 832. In accordance with at least one embodiment, the authentication information management module 832 may be configured to maintain authentication information on behalf of a user for a plurality of accounts, receive and analyze information indicating potentially compromised authentication information, and take appropriate action such as automatically updating the authentication information of the user to maintain security as described herein.

Figure 9:
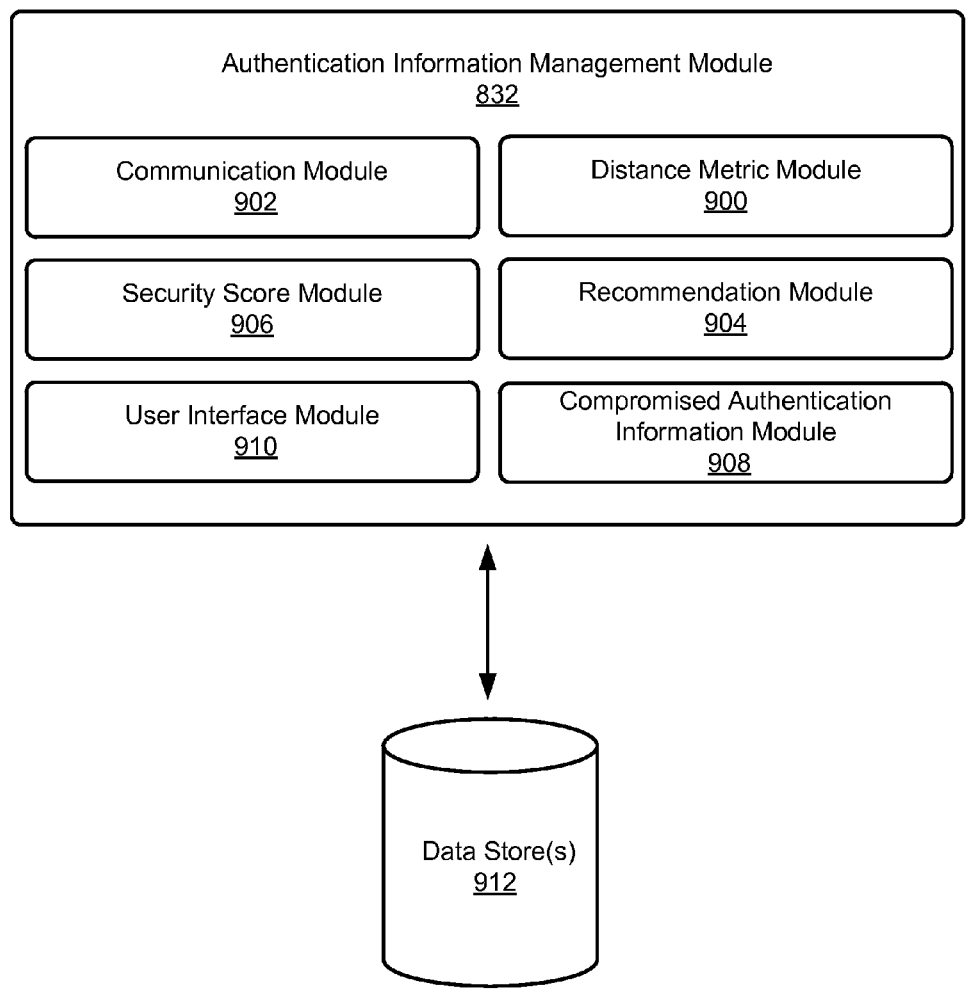
FIG. 9 is a schematic diagram that illustrates an example of an authentication information management module and associated data stores in accordance with at least one embodiment.

FIG. 9 is a schematic diagram that illustrates an example of an authentication information management module and associated data stores in accordance with at least one embodiment. It should be noted that while multiple modules are described in the example authentication information management module 832, the processes and methods described herein can be performed by more or less modules within memory such as memory 218 described above. In addition, while the modules 900-910 included in authentication information management module 832 are displayed and described as distinct modules, in some embodiments they may be included within one another to further facilitate methods and systems described herein. In accordance with at least one embodiment, the authentication information management module 832 may include a distance metric module 900, a communication module 902, a recommendation module 904, a security score module 906, a compromised authentication information module 908, and a user interface module 910 in communication with one or more data stores 912 (which may be an example of the one or more data stores 830 from FIG. 8).

In accordance with at least one embodiment, the authentication information management module 832 may be configured to maintain authentication information for one or more accounts, services, or login requests on behalf of a user. The authentication information management module 832 may securely maintain the authentication of the user in a data store such as data store 912. In accordance with at least one embodiment, the authentication information management module 832 may be configured for changing or updating the authentication information of a user based at least in part on receiving authentication information that has been marked as potentially compromised from a password fraud detection service or from some other third party source. The authentication information management module 832 may generate the authentication information for updating the authentication information for the user utilizing any hexadecimal values or any symbol and character sets from any language thus increasing entropy for the generated authentication information and ensuring uniqueness and removing restrictions due to language barriers of the user. The authentication information management module 832 and the compromised authentication information module 908 may be configured for receiving the compromised authentication information and updating the authentication information maintained for the user.

In an embodiment, the authentication information management module 832 may be configured for invoking an application programming interface for obtaining the operating system login authentication information for a user. The authentication information management module 832, the distance metric module 900, and the recommendation module 904 may be configured for determining whether the operating system login authentication information is different from the other authentication information maintained on behalf of the user for other accounts, services, or login requests utilizing authentication/password generation security protocols. For example, the authentication generation security protocols may require that the operating system login authentication information be a certain entropic distance from the authentication information maintained for the user. If the operating system login authentication information violates the authentication generation security protocol than the recommendation module 904 may generate a recommendation urging the user to update or change their operating system login authentication information via a provided user interface by user interface module 910. In some embodiments, the operating system login authentication information may be requested by module 832 using the user interface module 910 to obtain the operating system login authentication information from the user.

In accordance with at least one embodiment, the authentication information management module 832 may maintain one or more authentication generation security protocols in data store 912 and update the security protocols based on information or an indication received from the service provider. The authentication generation security protocols may require that the authentication information or passwords maintained on behalf of the user for each account must also be unique according to an authentication information space distance metric. In an embodiment, the authentication information management module 832 may be configured for maintaining policies for whitelisting certain services, login requests, and accounts. The authentication information maintained on behalf of the user for whitelisted services, login requests, and accounts may violate the security protocols requiring that each password be different from each other yet, be maintained by the authentication information management module 832. For example, when a user is specifying a password for logging into a particular service it may be similar to the password for another service yet the authentication information management module 832 may allow the specification if both services are included in the approved or whitelisted services according to the policies. In an embodiment, the communication module 902 may be configured to request or obtain authentication information scope rules from the password fraud detection service or any other maintainer of compromised authentication information. The communication module 902 may maintain and update the authentication information scope rules in the one or more data stores 912. In an embodiment, the recommendation module 904 may utilize the authentication information scope rules for generating a recommendation to update or for automatically updating the authentication information for a user. For example, although a generated password may be unique or accord to the password generation rules for entropic or non-entropic distance, the minimum or maximum scope of passwords accepted by a provider of an account may not allow the generated password (the generated password is too long). Thus, the recommendation module 904 may utilize the indicated maximum and minimum requires as included in the authentication information scope rules to generate an appropriate or as appropriate password considering the constraints of the provider of the account.

In accordance with at least one embodiment, the distance metric module 900 may access the one or more authentication security protocols to determine a distance between the authentication information maintained for the user and authentication information that has been marked as potentially compromised. The distance metric module 900 may also determine the distance between each piece of authentication information to other pieces of authentication information maintained on behalf of the user. The authentication security protocols may require, for example, each password be a certain password space distance from each other to ensure uniqueness and increase security. The one or more authentication security protocols may utilize a an authentication information space distance metric that can include non-entropic characteristics such as length of a password, character set, complexity, order of character, structural similarity or entropic distance metrics for any portion of the password or authentication information. As described above, the authentication information management module 832 may utilize the distance metric determined by the distance metric module 900 and one or more security protocols to determine if the authentication information of the user should be updated or changed.

In accordance with at least one embodiment, the communication module 902 may be configured to receiving compromised authentication information for use by the compromised authentication information module 908, providing user interfaces generated by the user interface module 910, and for providing recommendations generated by the recommendation module 904 to the user for updating or changing their authentication information according to the provided recommendation. In accordance with at least one embodiment, the recommendation module 904 generates recommendations to provide to the user via the user interface module 910 and the communication module 902. The recommendation module 904 may generate the recommendation or notification to update the user's authentication information in response to a determination that the authentication information maintained for the user is similar to authentication information that has been indicated as compromised.

In an embodiment, the compromised authentication information module 908 may receive information about the compromised authentication information such as structural patterns, or password strength indicators. The recommendation module 904 may utilize the received structural pattern or password strength information to determine if the authentication information maintained for the user should be updated. The recommendation module 904 may utilize the received structural pattern or password strength information to further alter or update the generated recommendations before providing the recommendation to the user. For example, the recommendation module may indicate that the user should update their password for a particular account and that the new password should follow the structure of a word, symbol, character, word in order to avoid structural patterns recognized in compromised authentication information. In accordance with at least one embodiment, the recommendation module 904 and the user interface module 910 may provide interfaces that are enabled to receive input from the user regarding updating authentication information and letting the user know in real time whether the newly input authentication information is validated according to security protocols or policies and unique with respect to every other piece of authentication information maintained for the user as described above.

In accordance with at least one embodiment, the recommendation module 904 may generate recommendations with different granularities of urgency utilizing the determination made by modules 832 and 900 but also other notifications or emails from services/accounts that indicate a data breach has occurred. In an embodiment, the recommendation module 904 may immediately generate a recommendation for provision to the user which will require the user update their authentication information for a particular account before any other action can be taken on the client/user device. In accordance with at least one embodiment, the security score module 906 may analyze the authentication information generated by the authentication information management module 832 to determine an authentication information score which can be compared to a threshold for the account that the authentication information is associated with. The one or more security protocols may require that the generated score exceed the associated threshold before the generated authentication information can replace the previous authentication information that is similar to a compromised authentication information. The score generated by the security score module 906 may represent the strength and security of the newly generated authentication information. The security score module 906 may maintain and update one or more thresholds for each account in a data store such as data store 912. The thresholds may vary depending on the sensitivity of information associated with the account/authentication information or the behavior of the account, service, or login request. In an embodiment, the security score module 906, the recommendation module 904, and the distance metric module 900 may determine a score for authentication information being specified by the user, apply appropriate security protocols and thresholds, and inform the user via the user interface module 910 if the input authentication information is acceptable or if the user needs to try again.

The compromised authentication information module 908 may be configured to receive and analyze compromised authentication information from a password fraud detection service or from some other third party. The compromised authentication information module 908 may determine if any of the information contained in the compromised authentication information is similar or an exact match to any of the authentication information maintained on behalf of the user according to methods described above. The amount of similarity or authentication information space distance between any two pieces of authentication information may be specified by policies maintained by the authentication information management module 832. For example, if a password maintained for the user by the authentication information management feature is within a certain range of password space distance metric from a password included in the compromised password information then the compromised authentication information module 308 may communicate with modules 832, 904, and 906 to begin generating a recommendation or updating the similar password maintained for the user. In accordance with at least one embodiment, the compromised authentication information module 908 and communication module 902 may be configured to analyze incoming emails or notifications from accounts or services associated with the authentication information maintained for the user and determine that a data breach has occurred. Upon analyzing the incoming emails or notifications, the compromised authentication information module 908 may communicate with modules 832, 900, 904, and 906 to automatically update or change any authentication information associated with the account or services that provided the email or notification. The compromised authentication information module 908 may invoke and application programming interface for accessing incoming emails or notifications or the accounts and services may opt-in to enable module 908 to be provided the notifications directly.

Figure 10:
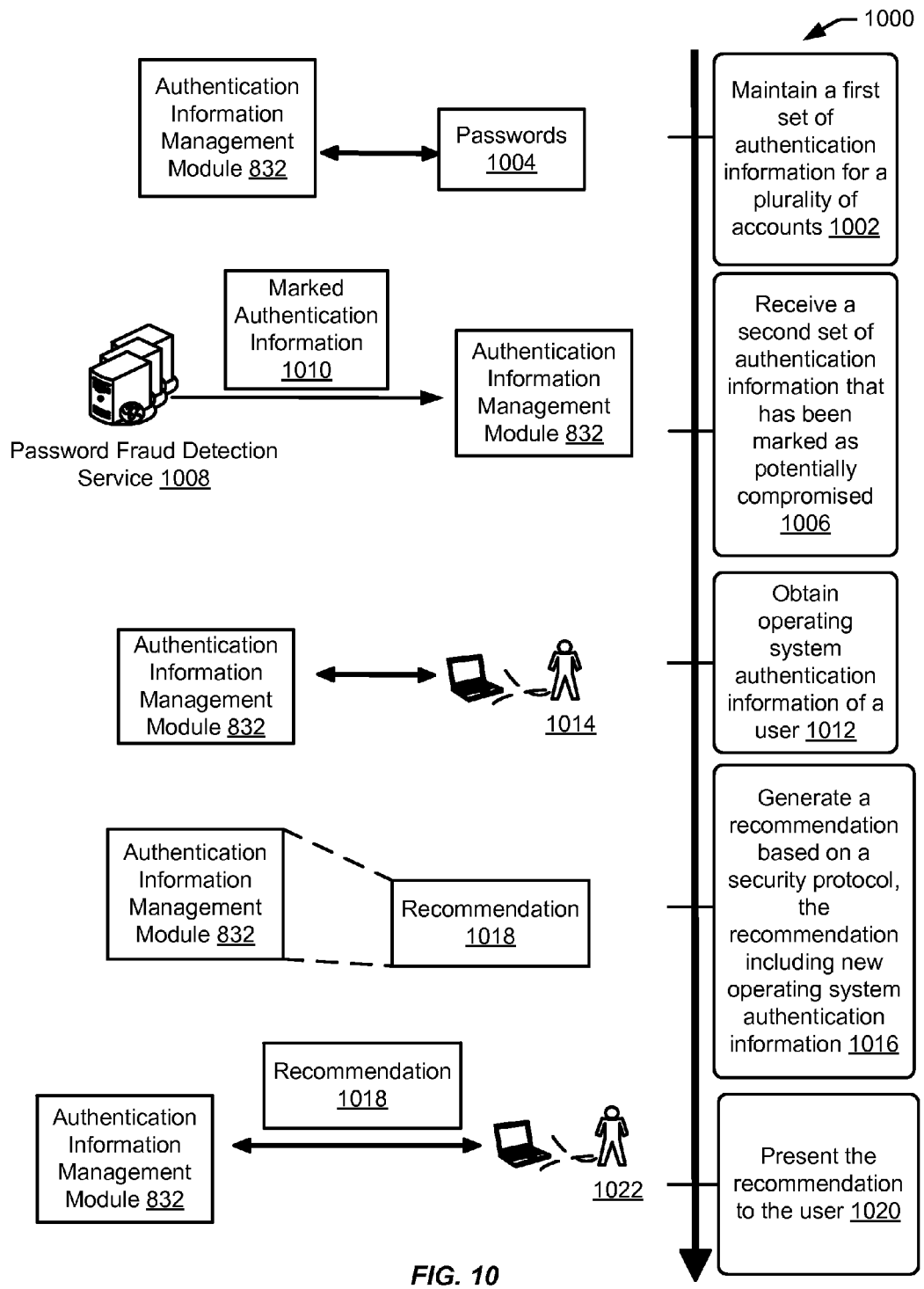
FIG. 10 is an illustrative flow for an authentication information management feature in accordance with at least one embodiment.

FIG. 10 is an illustrative flow for an authentication information management feature in accordance with at least one embodiment. The illustrative flow 1000 may begin by maintaining a first set of authentication information for a plurality of accounts at 1002. For example, an authentication information management module 832 (from FIG. 8) provided by the service provider may maintain one or more passwords 1004 for the plurality of accounts on behalf of a user. The illustrative flow 1000 may continue by receiving a second set of authentication information that has been marked as potentially compromised at 1006. In an embodiment, a password fraud detection service may provide authentication information that has been marked as potentially compromised 1010 to the authentication information management module 832. The illustrative flow 1000 may continue by obtaining operating system authentication information of a user at 1012. In an embodiment, the authentication information management module 832 may request the operating system authentication information from the user 1014 via a user interface or may invoke an application programming interface for obtaining the operating system authentication information from the local client device/user device of the user.

The illustrative flow 1000 may continue at 1016 by generating a recommendation based on a security protocol where the recommendation includes new operating system authentication information. For example, the authentication information management module 832 may generate the recommendation 1018 based on the security protocols that require that each password maintained on behalf of the user be unique or be a certain password space distance from each other including the operating system authentication information. Or, the authentication information management module 832 may determine that the structural pattern of the operating system authentication information is similar to a structural pattern that has been indicated as compromised by the password fraud detection service 1008. The illustrative flow 1000 may conclude at 1020 by presenting the recommendation to the user. In an embodiment, the authentication information management module 832 may provide the recommendation 1018 to the user via the client/user device 1022. The recommendation may be enabled to allow the user to update/change their operating system authentication information as verified by the security protocols and policies maintained by the authentication information management module 832 as described herein.

Figure 11:
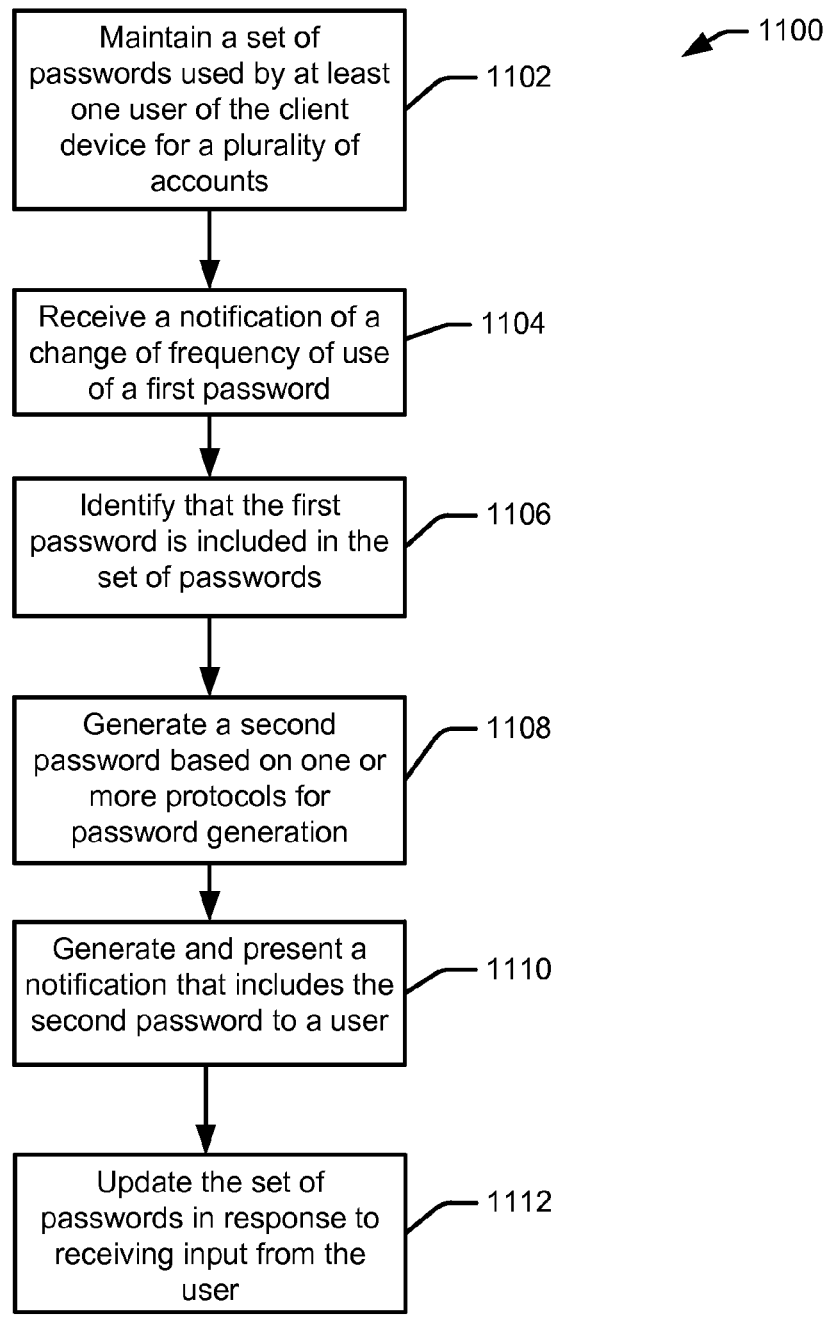
FIG. 11 is a flow diagram of a process for an authentication information management feature in accordance with at least one embodiment.

FIG. 11 is a flow diagram of a process for an authentication information management feature in accordance with at least one embodiment. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 810 (e.g., utilizing at least one of the authentication information management module 832, the distance metric module 900, the communication module 902, the recommendation module 904, the security score module 906, the compromised authentication information module 908, and the user interface module 910 in communication with one or more data stores 312) shown in FIGS. 8 and 9, may perform the process 1100 of FIG. 11. In FIG. 11 the process 1100 may include maintaining a set of passwords used by at least one user of a client device for a plurality of accounts at 1102. In accordance with at least one embodiment and as described above the authentication information management feature may maintain authentication information on behalf of the user for a plurality of accounts including security question answers and other authenticating information. The process 1100 may include receiving a notification of a change of frequency of use of a first password at 1104. The notification may include the first password and the change of frequency of use may be determined as abnormal or alarming according to the password fraud detection service in communication with the authentication information management application as described herein.

The process 1100 may include identifying that the first password is included in the set of passwords at 1106. In an embodiment, the authentication information management feature may utilize a sub-string comparison between the first password and each password in the set of passwords to determine similarity or inclusion. The process 1100 may include generating a second password based on one or more protocols for password generation at 1108. In an embodiment, the one or more protocols for password generation may require that the second password be a specified entropic distance from each password included in the set of passwords maintained by the application. The process 1100 may include generating and presenting a notification that includes the second password to a user at 1110. In some embodiments, the notification may be presented to the user via an application on a client device such as the authentication information management application provided by the one or more service provider computers 810 of FIG. 8. The process 1100 may conclude at 1112 by updating the set of passwords in response to receiving input from the user. In accordance with at least one embodiment, the authentication information management application may update the set of passwords used by the at least one user by replacing an instance of the first password in the set of passwords with the second password.

Compromised Authentication Information Clearing House

Systems, methods, and computer-readable medium for maintaining and sharing potentially compromised authentication information for a plurality of accounts with peer members of a network group are described herein. In accordance with at least one embodiment, frequency of use information may be provided to one or more peer members of a compromised authentication information clearinghouse. An authentication information clearinghouse service that receives or obtains the frequency of use information from a password fraud detection service, as described above, may determine patterns associated with the frequency of use information for generating recommendations for updating authentication for one or more accounts associated with each member of the peer members.

In accordance with at least one embodiment, an authentication information clearinghouse service provider that implements an authentication information clearinghouse feature may enable tagging or specifying access rights for at least a portion of maintained compromised authentication information. The tagging or access rights can be utilized to determine which information to share to peer members and non-peer members of the compromised authentication information peer network group. In an embodiment, organizations or entities may join the compromised authentication information peer network group by being vouched for by a percentage of the current members. A member of the peer network group may be provided with a public/private encryption key for invoking an application programming interface (API) for requesting or providing compromised authentication information to other members. In accordance with at least one embodiment, the authentication information clearinghouse feature can generate and provide recommendations or notifications to an authentication information management application as described herein. Instructions can also be provided to user/client devices for updating authentication information for an account associated with a user.

Figure 12:
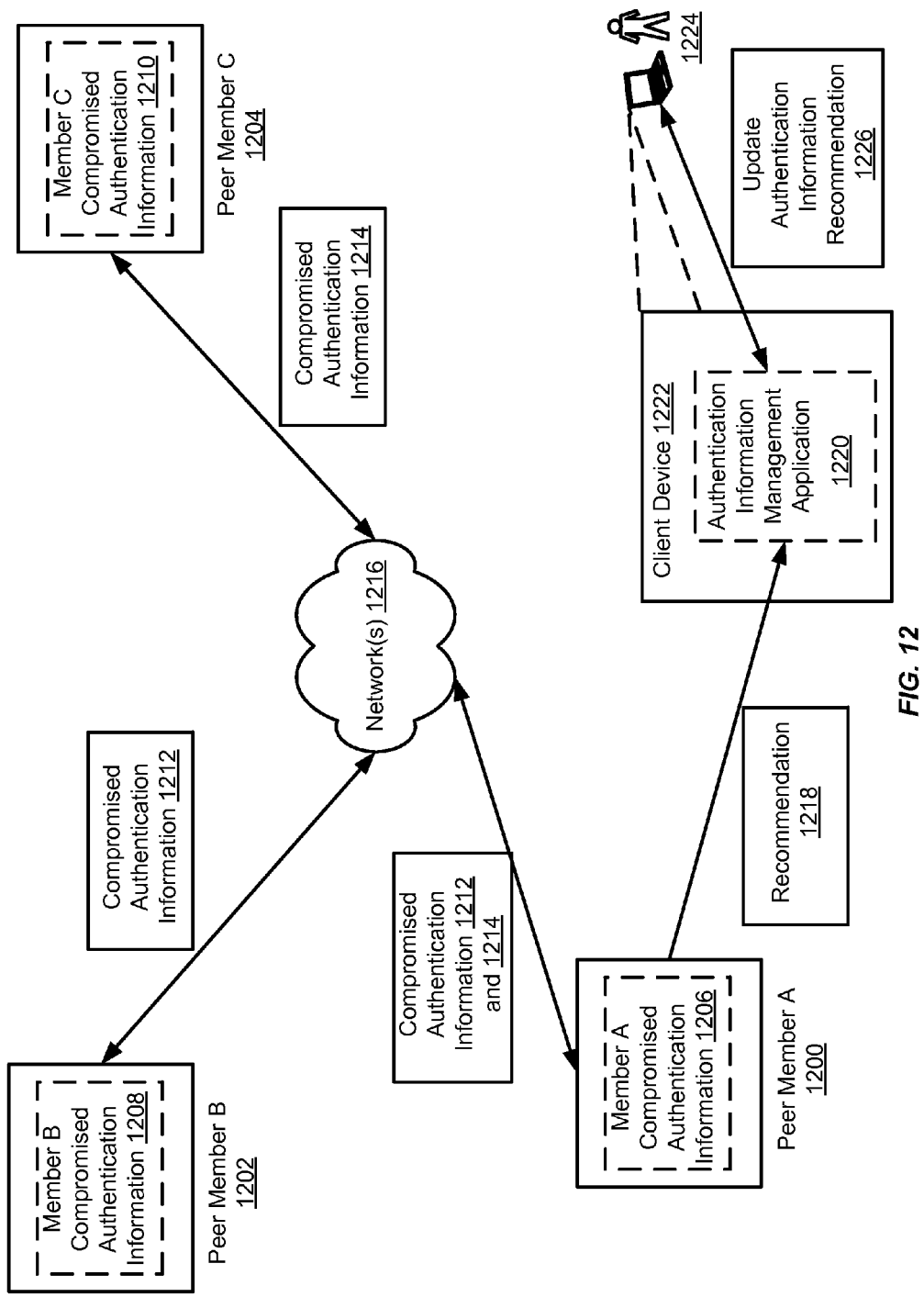
FIG. 12 is a block diagram that illustrates an example of an authentication information clearinghouse feature in accordance with at least one embodiment.

FIG. 12 is a block diagram that illustrates an example of an authentication information clearinghouse feature in accordance with at least one embodiment. In an embodiment, an authentication information clearinghouse module may be implemented by a service provider that represents a member, such as peer member A 1200, that includes one or more other members (1202, 1204) that each maintain their own set of compromised authentication information 1206-1210 utilized to compromise associated accounts of each member respectively. In accordance with at least one embodiment, the service provider may receive or request other member's compromised authentication information 1212 and 1214 over one or more networks 1216 utilizing an API signed by a private/public encryption key shared between members. The compromised authentication information 1212 may be an example of the frequency of use information for passwords 104 from FIG. 1 and it may be received, obtained, or maintained by a password fraud detection module such as module 100 associated with each member.

In an embodiment, the information 1212 and 1214 provided by each member may depend on the tags associated with the information by each member 1208 and 1210 respectively as described herein. The service provider member A 1200 may utilize the received compromised authentication information 1212 and 1214 to update the compromised authentication information 1206. The service provider member A 1200 may determine if any of the accounts associated with it are utilizing authentication information similar or identical to the updated authentication information. Upon determining that any accounts are utilizing authentication information that has been marked as potentially compromised by other members (1202 and 1204), the service provider member A may generate and provide a recommendation 1218 to an authentication information management application 1220 configured to run on a client device 1222.

The recommendation may include instructions to simply query and require a user, such as user 1224, update their account authentication information for one or more accounts. In an embodiment, the recommendation may include information including an authentication structure and time period of using the authentication structure to the authentication information management application 1220 which can then automatically update the authentication information according to the structure on behalf of the user. In accordance with at least one embodiment, the authentication information management application 1220 may provide an update authentication information recommendation 1226 to the user 1224 that enables the user to update their authentication information for one or more accounts where the recommendation requires that the user adhere to the structure provided by the recommendation 1218 before assigning the new authentication information to the one or more accounts.

Figure 13:
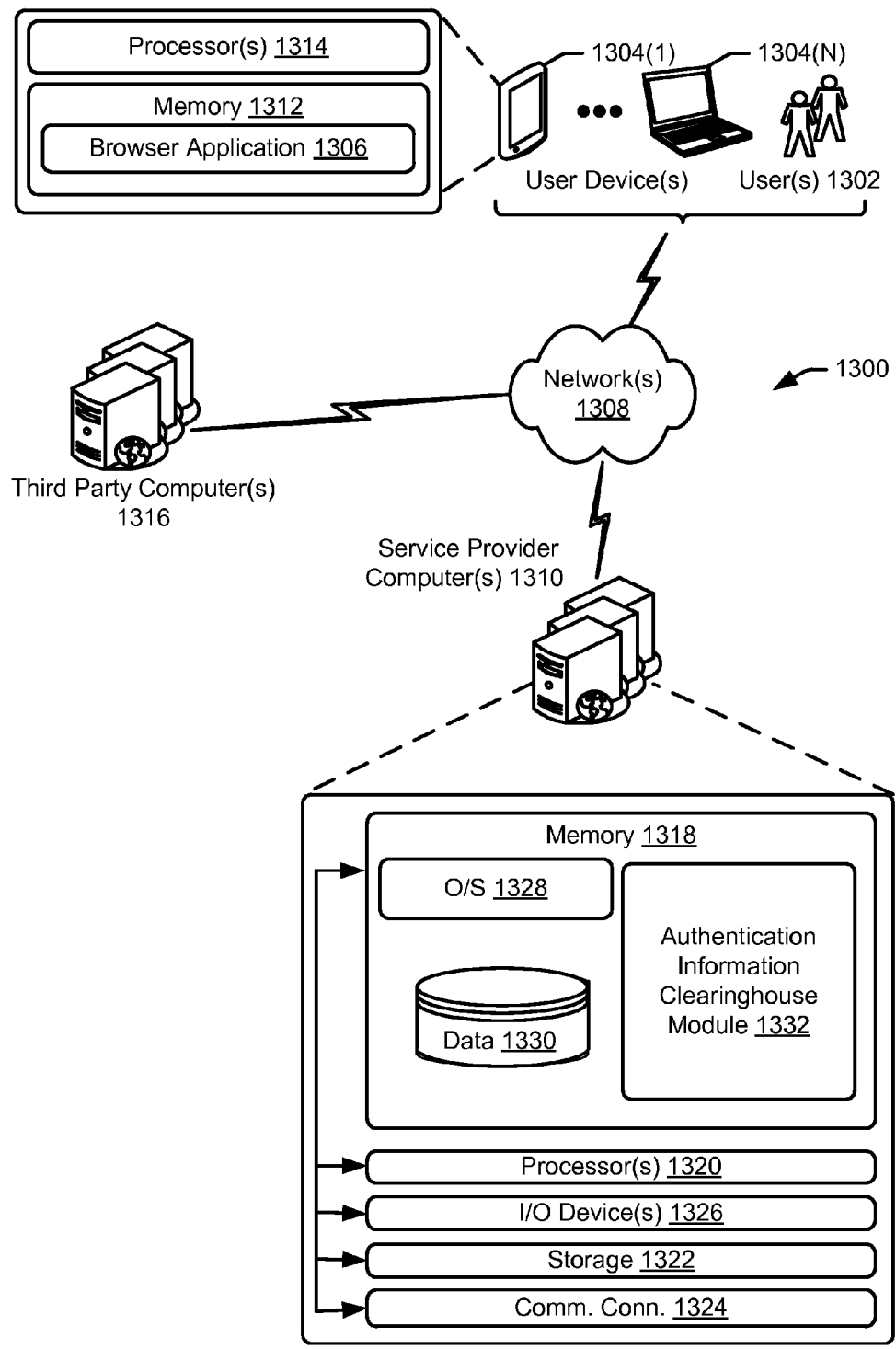
FIG. 13 illustrates an example architecture for implementing an authentication information clearinghouse feature as described herein that includes one or more service provider computers and/or a user device connected via one or more networks in accordance with at least one embodiment.

FIG. 13 illustrates an example architecture for an authentication information clearinghouse feature as described herein that includes one or more service provider computers and/or a user device connected via one or more networks in accordance with at least one embodiment. Components in FIG. 13 are similar to components illustrated and described in FIG. 2 above except for the portions described below and are numbered herein accordingly.

Turning to the contents of the memory 1318 in more detail and as will be described in further detail in FIG. 14, the memory 1318 may include an operating system 1328, one or more data stores 1330, and/or one or more application programs or services for implementing the features disclosed herein including an authentication information clearinghouse module 1332. In accordance with at least one embodiment, the authentication information clearinghouse module 1332 may be configured to maintain compromised authentication information for a plurality of accounts, receive and analyze other peer member's compromised authentication information, and take appropriate action such as automatically updating the maintained compromised authentication information, determining compromise characteristics associated with the maintained compromised authentication information, generate a recommendation for updating authentication information associated with one or more accounts to maintain security as described herein.

Figure 14:
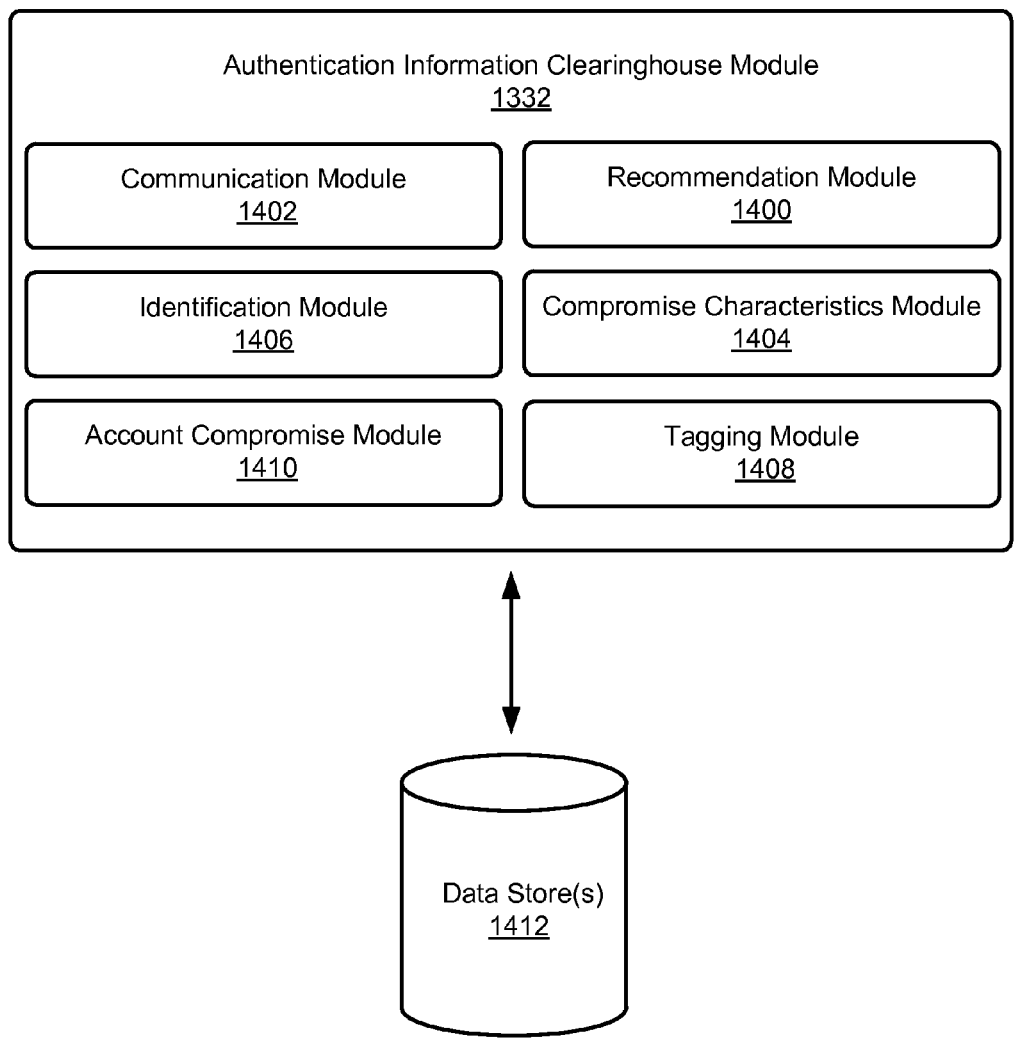
FIG. 14 is a schematic diagram that illustrates an example of an authentication information clearinghouse module.

FIG. 14 is a schematic diagram that illustrates an example of an authentication information clearinghouse module. It should be noted that while multiple modules are described in the example authentication information clearinghouse module 1332, the processes and methods described herein can be performed by more or less modules within memory such as memory 1318 described above. In addition, while the modules 1400-1410 included in authentication information clearinghouse module 1332 are displayed and described as distinct modules, in some embodiments they may be included within one another to further facilitate methods and systems described herein. In accordance with at least one embodiment, the authentication information clearinghouse module 1332 may include a recommendation module 1400, a communication module 1402, a compromise characteristics module 1404, an identification module 1406, a tagging module 1408, and an account compromise module 1410 in communication with one or more data stores 1412 (which may be an example of the one or more data stores 1330 from FIG. 13).

In accordance with at least one embodiment, the authentication information clearinghouse module 1332 may maintain authentication information that has been marked as potentially compromised for a plurality of accounts as described herein. The authentication information clearinghouse module 1332 and the communication module 1402 may be configured to receive authentication information that has been marked as compromised from one or more members of the authentication information peer network group and provide maintained and updated authentication information to other members. Communication between members regarding authentication information, compromise characteristics, breach notifications, or user information associated with accounts may be encrypted using a public-private encryption key provided to members. The communication module 1402 and the authentication information clearinghouse module 1332 may receive and provide the above described information by utilizing publicly facing APIs that require signature by the public-private encryption key shared by members.

In accordance with at least one embodiment, the communication module 1402 may be configured to filter or prohibit the provision of certain information associated with the authentication information that has been marked as potentially compromised utilizing the tags associated with the information or by applying one or more policies specified by the service provider. In an embodiment, the service provider may share portions of the authentication information to non-peer members or the general public. However, sensitive information such as user names or account information may be prohibited from being shared by the communication module 1402. The communication module 1402 may also utilize the tagging information associated with the authentication information to determine which portions of the maintained authentication information should be provided to non-peer members. For example, certain tags may indicate that portions of the authentication information be shared with only peer members, certain peer members, non-peer members, or not be shared at all.

In accordance with at least one embodiment, the tagging module 1408 may be configured to enable the service provider or each peer member to tag or color portions of the maintained authentication information indicating different access levels. The tagging module 1408 may be configured to tag the information according to user provided commands or by utilizing policies provided by the service provider which provide a set of rules for determining how to tag each piece of information maintained by the authentication information clearinghouse module 1332. As described above, the communication module 1402 may utilize the tags associated with the authentication information to determine which portions of the information to share to other peer members or to non-peer members. The tagging information may be represented in metadata associated with the authentication information.

In accordance with at least one embodiment, the recommendation module 1400 may be configured to generate recommendations for updating authentication information for accounts that currently are utilizing authentication information which has been marked as potentially compromised by another peer member or includes compromise characteristics as determined by the compromise characteristics module 1404. The recommendations generated by recommendation module 1400 can include different granularities based on the intended audience. For example, if recommendations are being generated for provisioning to a peer member, the granularity may include utilizing a particular authentication information structure for all e-commerce accounts or internet forum accounts.

The recommendations may also be more general including a general password structure that should be utilized by all non-peer members for any account. In an embodiment, the recommendations may include information such as authentication information strength, an entropy level, a uniqueness distance when compared to other associated authentication information that takes into account entropic distance or any non-entropic space metric. The recommendation module 1400 may also determine a time period to utilize the recommend authentication information structure based on analyzing patterns associated with previous recommendations or by analyzing the compromise characteristics themselves. The recommendation module 1400 may also be configured to receive input regarding the time period to utilize with particular recommendations, such as a default time period to provide for recommendations intended for non-peer members.

In accordance with at least one embodiment, the compromise characteristics module 1404 may maintain metadata associated with the authentication information that has been marked as compromised. The metadata may include information such as the structure of the authentication information, length of the authentication information, internet protocol location information (for last access or use of the authentication information), device access information (indicating a device name associated with last use), or any other suitable characteristics that could be associated with the authentication information. The metadata maintained by the compromise characteristics module 1404 may aid the account compromise module 1410 in determining account behavior associated with the potentially compromised authentication information. For example, the account compromise module 1410 may utilize the metadata to determine if any other accounts have a similar IP location address, or have been accessed from the same user device. The recommendation module 1400 may utilize the additional account information determined by the compromise characteristics module 1404 to generate a recommendation or notification that may be provided to an authentication information management application associated with the account. The metadata may also be provided to a password fraud detection service as described herein for identifying other accounts to mark as potentially compromised.

In accordance with at least one embodiment, the identification module 1406 may be configured to determine if one or more accounts associated with the service provider are utilizing authentication information that has been marked as potentially compromised. For example, the set of authentication information maintained by the service provider may currently not indicate that an account is utilizing authentication information that is marked as compromised. However, in response to updating the authentication information an account may be identified as using similar authentication information which should be updated to maintain account security. The identification module 1406 may identify similar authentication information by using at least clear text string comparison, clear text sub-string comparison, hash value comparisons, or utilizing encryption/decryption within a hardware security module as described in "Hardening Tokenization Security and Key Rotation," application Ser. No. 12/242,746.

In accordance with at least one embodiment, the account compromise module 1410 may be configured to maintain and invoke a plug-in or API that interacts with an authentication information management application and email applications on a user's user/client device to obtain contact information. The account compromise module 1410 may utilize user information associated with the compromised authentication information received from other peer members or user information associated with compromised authentication information maintained to determine whether an email, instant message, or some other digital communication being received by the user is originating from a contact that has been indicated as utilizing compromised authentication information.

A notification may be generated by the account compromise module 1410 and provided to the authentication information management application to inform the user that an email or instant message is being received from a contact that may be potentially compromised. This could alert the user to a potential phishing attempt and increase security for the user. In an embodiment, the account compromise module 1410 may generate instructions to provide to the authentication information management application to update other accounts associated with a particular user in response to identifying that one account maintained on behalf of the user is utilizing potentially compromised authentication information. In another embodiment, the account compromise module 1410 in conjunction with the communication module 1402 may generate and provide a notification to a user or to one or more users associated with a plurality of accounts to update their authentication information based on identifying that one account may be utilizing compromised authentication information. In embodiments, the account compromise module 1410 may provide account rules or policies which indicate an additional factor to consider before updating the authentication information associated with an account according to the features described herein. For example, a provider of a particular account may provide a rule which indicates that the username for the account and authentication information must be similar between accounts before an instruction to update the authentication information should be provided to the authentication information management application. Thus, a plurality of accounts for a user may utilize authentication information similar to authentication information that has been marked as potentially compromised as described herein, but as long as the username's for the accounts are different, the authentication information management application may not update the authentication information based on the obtained/requested account rules or policies.

Figure 15:
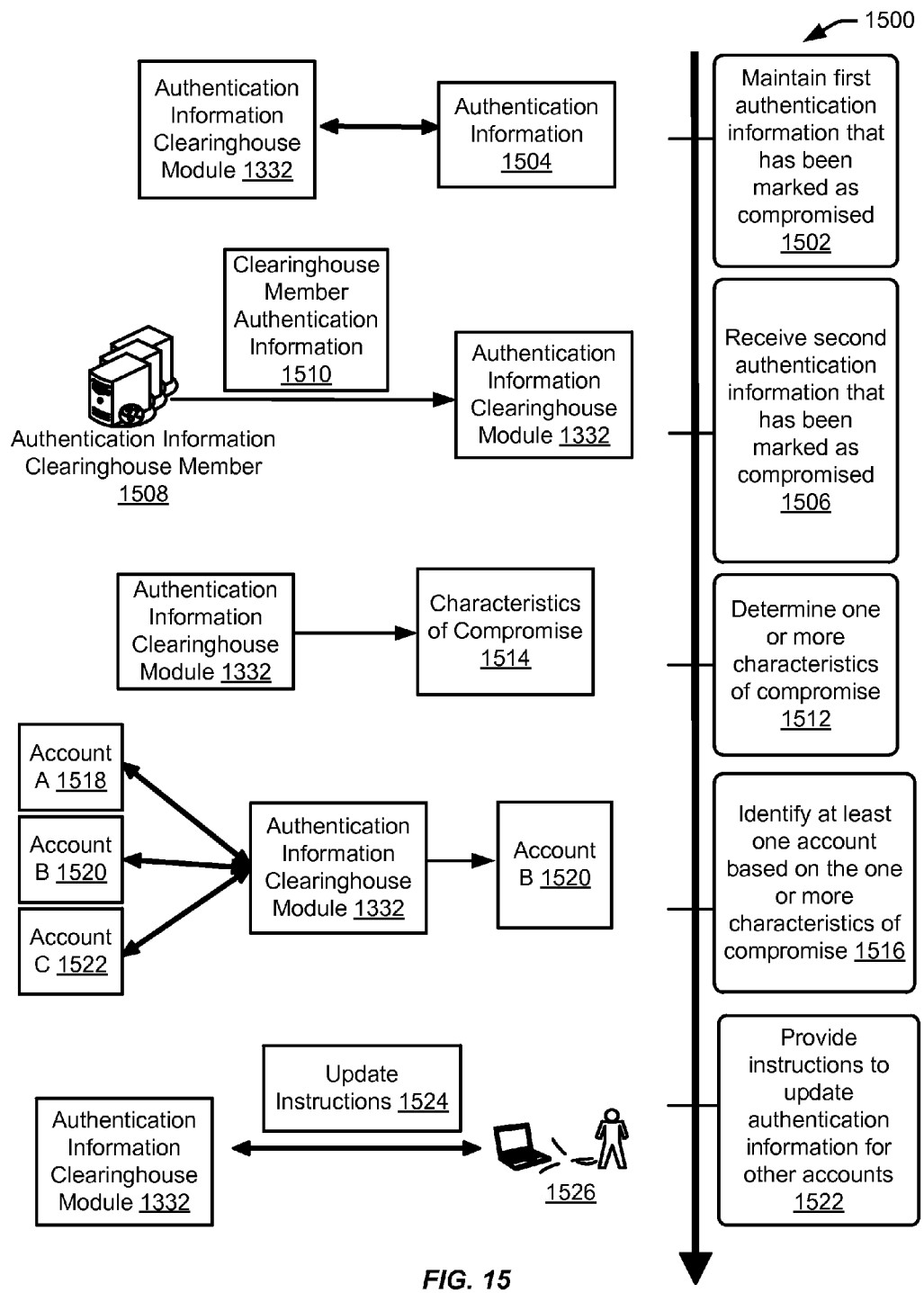
FIG. 15 is an illustrative flow for an authentication information clearinghouse feature in accordance with at least one embodiment.

FIG. 15 is an illustrative flow for an authentication information clearinghouse feature in accordance with at least one embodiment. The illustrative flow 1500 may begin by maintaining first authentication information that has been marked as compromised at 1502. For example, an authentication information clearinghouse module 1332 (from FIG. 3) provided by the one or more service provider computers 1310 may maintain compromised authentication information 1504 for a plurality of accounts on behalf of one or more users. The illustrative flow 1500 may continue by receiving a second authentication information that has been marked as compromised at 1506. In an embodiment, an authentication information clearinghouse member 1508 may provide their compromised authentication information 1510 to the authentication information management module 1332. The illustrative flow 1500 may continue by determining one or more characteristics of compromise at 1512 for the first and second authentication information that has been marked as compromised. In an embodiment, the authentication information clearinghouse module 1332 may determine the characteristics of compromise 1514 by analyzing metadata associated with the first and second authentication information that has been marked as compromised. As described above, the metadata associated with the authentication information may include information such as internet protocol (IP) address information for login requests, user information associated with the authentication information/account combination, time stamp information associated with the last use of the authentication information, time stamp information for the last update to the authentication information, and authentication information structure. Thus, the characteristics of compromise 1514 may include any of the information indicated by the metadata as described herein.

The illustrative flow 1500 may continue at 1516 by identifying at least one account based on the one or more characteristics of compromise. For example, the authentication information clearinghouse module 1332 may identify a pattern associated with the characteristics of compromise such as a repeating authentication information structure associated with the compromised authentication information/accounts. The authentication information clearinghouse module 1332 may analyze one or more associated accounts 1518-1522 to identify an account, such as account B 1520, whose authentication information has characteristics similar to the determined characteristics of compromise. Or, the authentication information clearinghouse module 1332 may determine that the structural pattern of account B's 1520 authentication information is similar to a structural pattern that has been identified in the characteristics of compromise at 1512. The illustrative flow 1500 may conclude at 1522 by providing instructions to update authentication information for other accounts. In an embodiment, the authentication information clearinghouse module 1332 may generate and provide update instructions 1524 to an authentication information management application configured to maintain the authentication information for a user associated with account B 1520 such as user 1526. The update instructions 1524 may include instructions for the authentication information management application to automatically update account B 1520 and all other accounts of the user associated with account B 1520 according to an identified authentication information structure that is different than the authentication information structure included in characteristics of compromise 1514 and as described herein.

Figure 16:
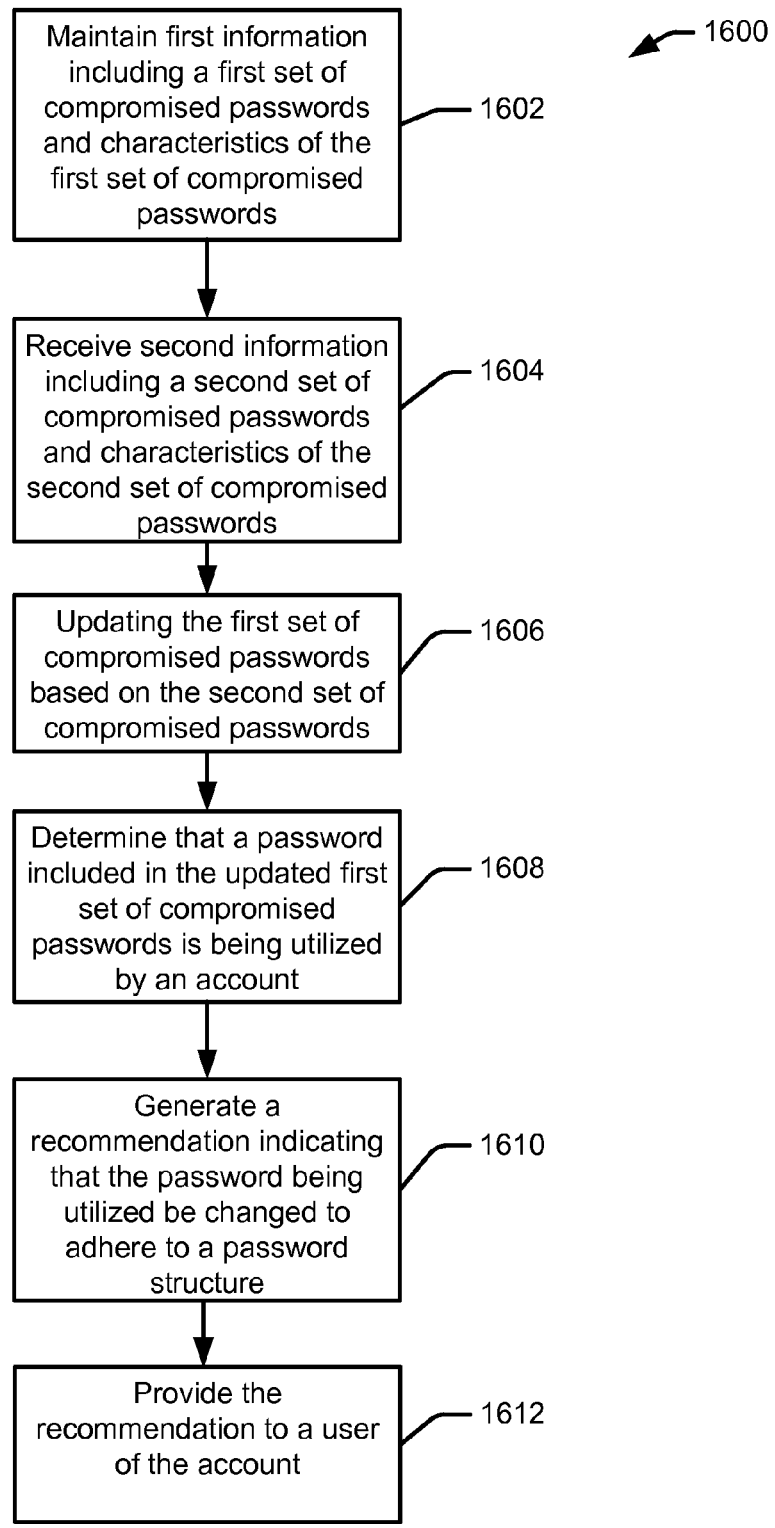
FIG. 16 is a flow diagram of a process for an authentication information clearinghouse feature in accordance with at least one embodiment.

FIG. 16 is a flow diagram of a process for an authentication information clearinghouse feature in accordance with at least one embodiment. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 1310 (e.g., utilizing at least one of the authentication information clearinghouse module 1332, the recommendation module 1400, the communication module 1402, the compromise characteristics module 1404, the identification module 1406, the tagging module 1408, and the account compromise module 1410 in communication with one or more data stores 1412) shown in FIGS. 13 and 14, may perform the process 1600 of FIG. 16. In FIG. 16 the process 1600 may include maintaining first information including a first set of compromised passwords and characteristics of the first set of compromised passwords at 1602. In an embodiment, the password characteristics can include password length, character set, complexity, or structure. The process 1600 may include receiving second information including a second set of compromised passwords and characteristics of the second set of compromised passwords. The second set of compromised passwords and characteristics may be maintained by a peer member group associated with the authentication information clearinghouse service provider described herein. The process 1600 may include updating the first set of compromised passwords based on the second set of compromised passwords. In an embodiment, the first set of compromised passwords may replace compromised passwords included in the first set with passwords included in the second set, append the second set of compromised passwords to the first set of compromised passwords, or perform a new ranking operation or determine a new normal distribution of each password in the first set utilizing the information associated with the second set of passwords.

The process 1600 may include determining that a password included in the updated first set of compromised passwords is being utilized by an account. In an embodiment, the authentication information clearinghouse feature may include analyzing the stored password for each account maintained to determine similarity or an identical match to a password included in the updated first set of compromised passwords. The process 1600 may include generating a recommendation indicating that the password being utilized by changed to adhere to a password structure. The password structure and a time period that the password structure should be secure for may be determined based on the first password characteristics and the second password characteristics. For example, the system may determine based on the first and second password characteristics that a particular password structure, word, word, symbol, and symbol is utilized by a large majority of the compromised passwords in the first set and second set. The authentication information clearinghouse feature may recommend a different structure utilizing at least this recognized pattern derived from the first and second characteristics. The process 1600 may conclude at 1612 by providing the recommendation to a user of the account. In an embodiment, the recommendation may enable a user to provide their new password for the account and verify that the provided password adheres to security protocols or the recommended structure.

Figure 17:
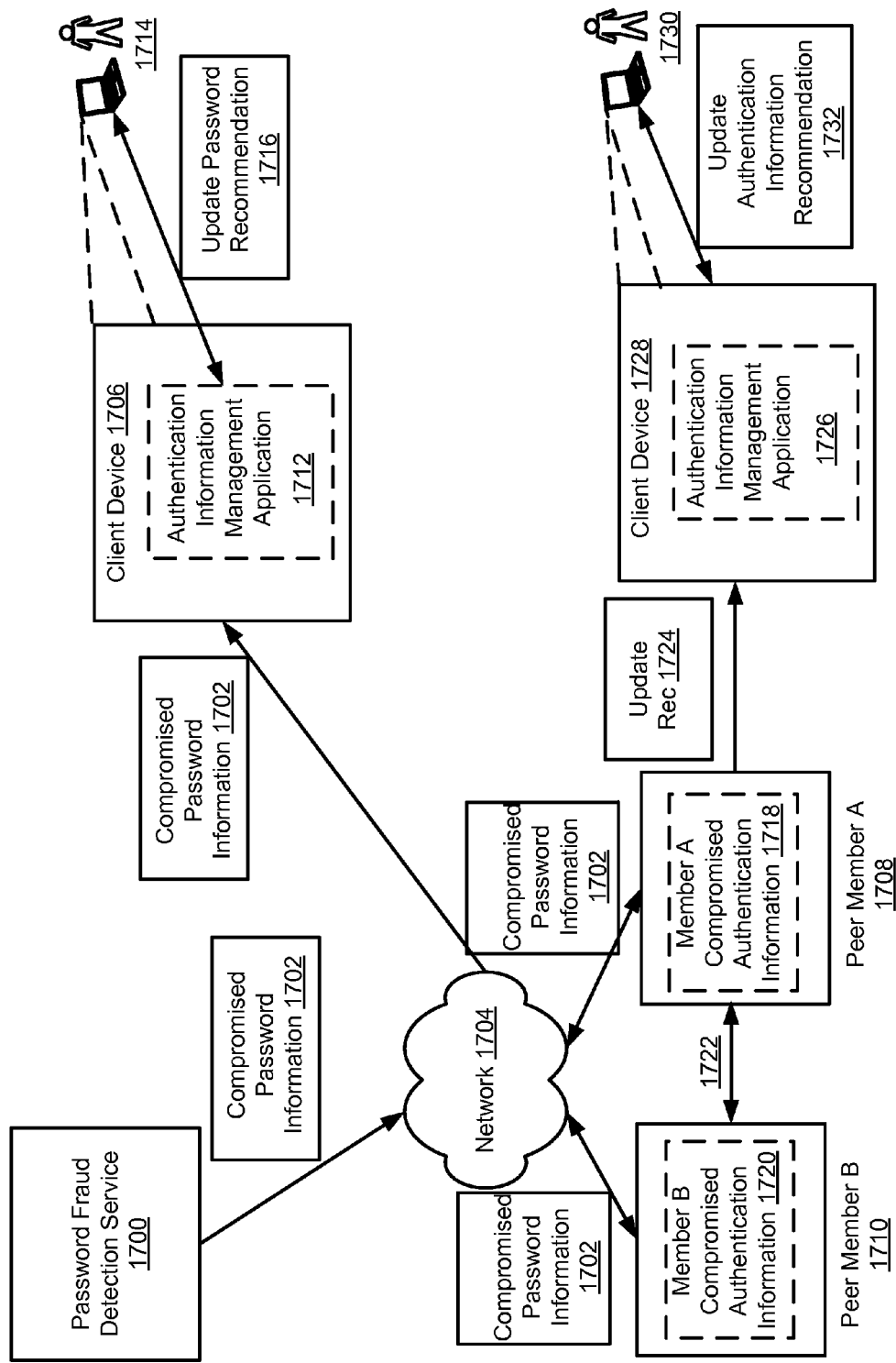
FIG. 17 is a block diagram that illustrates an example of a password fraud detection feature interacting with an authentication information management feature and authentication information clearinghouse feature in accordance with at least one embodiment.

FIG. 17 is a block diagram that illustrates an example of a password fraud detection feature interacting with an authentication information management feature and authentication information clearinghouse feature in accordance with at least one embodiment. FIG. 17 includes a password fraud detection service 1700 that may implement a password fraud detection module (such as password fraud detection module 100 from FIG. 1), providing compromised password information 1702 via one or more networks 1704 to a client device 1706 or one or more authentication information clearinghouse peer members, A 1708 and B 1710. The client device 1706 (which may be an example of the client device 704 from FIG. 7) may include an authentication information management application 1712 (which may be an example of authentication information management application 700 from FIG. 7). In accordance with at least one embodiment, the password fraud detection service 1700 may have generated the compromised password information 1702 based on comparing frequency of use information for authentication information associated with a plurality of accounts to one or more requests to set authentication information with the same plurality of accounts as described herein. For example, the compromised password information 1702 may include authentication information that was marked as potentially compromised because its frequency of use displayed an abnormal frequency of use for a plurality of accounts as compared to authentication information usage normally associated with the plurality of accounts.

In accordance with at least one embodiment, the authentication information management application 1712 may implement an authentication information management module and may maintain authentication information on behalf of a user 1714. The authentication information management application 1712 may be configured to receive/obtain and analyze compromised password information 1702 to determine or identify if any of the passwords maintained on behalf of user 1714 are included in the compromised password information 1702. The authentication information management application 1712 may utilize a variety of techniques to determine if there is any overlap or similarity between the passwords maintained on behalf of the user and the passwords that have been marked as potentially compromised including at least string similarity, sub-string similarity, hash value comparison, incremental value comparison or any suitable method for comparing authentication information. In accordance with at least one embodiment, in response to identifying or determining similarity between the compromised password information 1702 and the passwords maintained on behalf of user 1714, the authentication information management application 1712 may generate a recommendation such as an update password recommendation 1716 to provide to user 1714. The recommendation 1716 may enable the user 1714 to change or update any passwords that are similar to passwords that are marked as potentially compromised by the password fraud detection service 1700.

In accordance with at least one embodiment, each peer member, 1708 and 1710, may each maintain their own set of compromised authentication information 1718 and 1720 (the compromised authentication information may include a set of potentially compromised passwords or password information similar to 1702). As described above, the peer members 1708 and 1710 (which may be an example of peer members 1200 and 1202 from FIG. 12) may share 1722 or provide/receive their compromised authentication information with each other or other members of the peer network group. In response to receiving compromised authentication information, each member 1708 and 1710 may update the maintained compromised authentication information 1718 and 1720. In an embodiment, a peer member, such as peer member A 1708, may determine if any of the accounts associated with it are utilizing authentication information similar or identical to the updated compromised authentication information. Upon determining that any accounts are utilizing authentication information that has been marked as potentially compromised by other members (1710), the peer member A 1708 may generate and provide an update recommendation 1724 to an authentication information management application 1726 configured to run on a client device 1728. The update recommendation 1724 may include instructions to simply query and require a user, such as user 1730, update their account authentication information for one or more accounts. In an embodiment, the update recommendation 1724 may include information including an authentication structure and time period of using the authentication structure to the authentication information management application 1726 which can then automatically update the authentication information according to the structure on behalf of the user 1730. In accordance with at least one embodiment, the authentication information management application 1726 may provide an update authentication information recommendation 1732 to the user 1730 that enables the user to update their authentication information for one or more accounts where the recommendation requires that the user adhere to the structure provided by the update recommendation 1724 before assigning the new authentication information to the one or more accounts.

Figure 18:
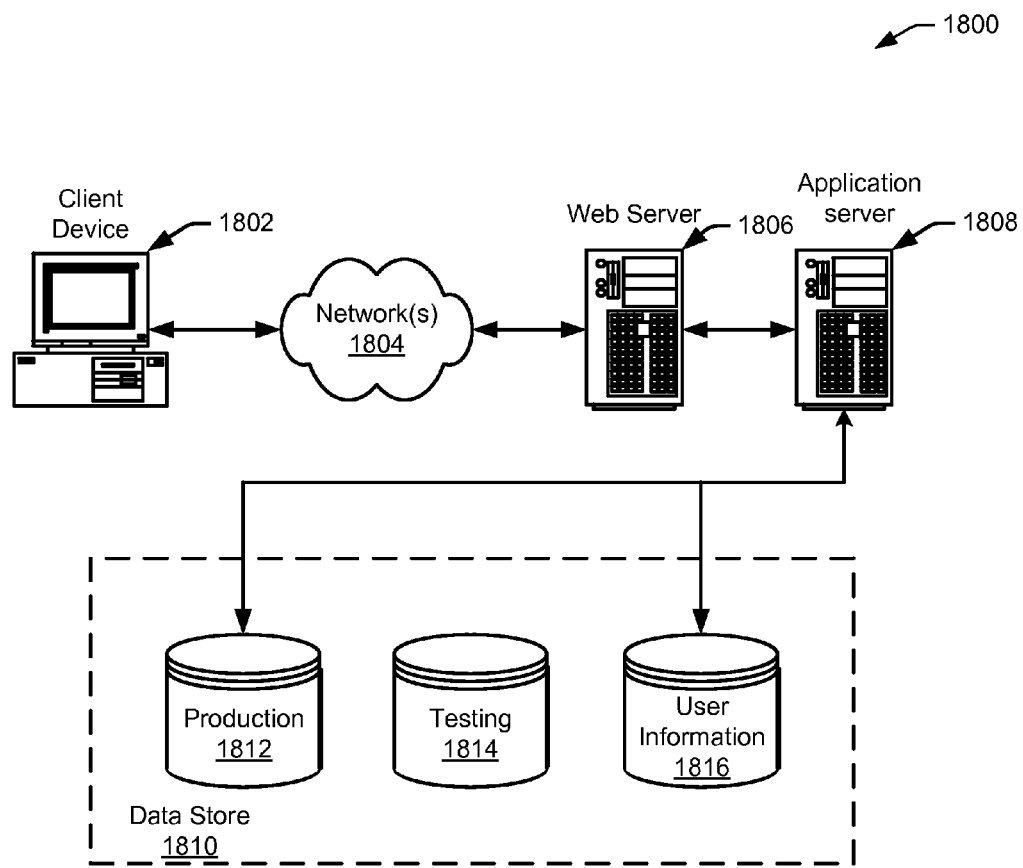
FIG. 18 illustrates an environment in which various embodiments can be implemented.

FIG. 18 illustrates aspects of an example environment 1800 for implementing aspects in accordance with various embodiments. As will be appreciated, although a Web-based environment is used for purposes of explanation, different environments may be used, as appropriate, to implement various embodiments. The environment includes an electronic client device 1802, which can include any appropriate device operable to send and receive requests, messages or information over an appropriate network 1804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1802 and the application server 1808, can be handled by the Web server. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing production data 1812 and user information 1816, which can be used to serve content for the production side. The data store also is shown to include a mechanism for storing log data 1814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

Embodiments of the disclosure can be described in view of the following clauses:

Clause 1. A computer-implemented method, comprising:
maintaining, by a computer system, a ranked list indicating frequency of use of passwords for accounts associated with an electronic marketplace, the ranked list maintained in a first data store separate from a second data store of secure passwords for the accounts associated with the electronic marketplace;

receiving a request to set a password for an account associated with the electronic marketplace;

flagging the account as potentially being compromised based at least in part on the frequency of use of the password surpassing the frequency of use of at least one password included in the ranked list within a specified time threshold; and in response to a subsequent request to access the account associated with the electronic marketplace:

requesting authentication of the account based at least in part on the account being flagged.

Clause 2. The computer-implemented method of clause 1, further comprising:

identifying a subset of passwords included in the ranked list, the subset of passwords determined based at least in part a threshold that is specified by the electronic marketplace; and flagging the account as potentially being compromised based at least in part on the frequency of use of the password surpassing the frequency of use of the at least one password included in the subset of passwords.

Clause 3. The computer-implemented method of clauses 1 to 2, further comprising in response to a subsequent request to set the password for the account, denying the subsequent request based at least in part on the account being flagged.

Clause 4. The computer-implemented method of clauses 1 to 3, wherein flagging the account as potentially being compromised is further based at least in part on a sub-string comparison of the password to an individual password included in the ranked list and a match threshold specified by the electronic marketplace.

Clause 5. The computer-implemented method of clauses 1 to 4, further comprising changing the password for the account to a generated password that is not included in the ranked list based at least in part on the account being flagged.

Clause 6. A computer-readable storage medium storing computer-executable instructions that, when executed by a computer system, configure the computer system to perform operations comprising:

maintaining first information about frequency of use of passwords associated with a plurality of accounts;

in response to receiving a request to set a password associated with an account of the plurality of accounts:

marking the account as potentially being compromised based at least in part on the frequency of use of the password included in the set request surpassing the frequency of use of at least one password included in the first information;

in response to the account being marked, identifying parameters associated with the marked account; and selecting one or more accounts of the plurality of accounts that have the parameters of the marked account for further investigation.

Clause 7. The computer-readable storage medium of clause 6 further comprising in response to the account being marked, denying access to the account.

Clause 8. The computer-readable storage medium of clauses 6 to 7, further comprising in response to the account being marked, requesting authentication of the account from a user associated with the account.

Clause 9. The computer-readable storage medium of clauses 6 to 8, further comprising:

in response to a subsequent request to access the account:

granting access to a test environment that simulates an environment normally associated with the account but that prohibits actions associated with the account; and obtaining information about the actions performed by the account in the test environment.

Clause 10. The computer-readable storage medium of clauses 6 to 9, wherein the first information about the frequency of use of the passwords associated with the plurality of accounts comprises a subset of passwords, the subset of passwords having a size that is based at least in part on second information associated with the plurality of accounts.

Clause 11. The computer-readable storage medium of clauses 6 to 10, wherein the second information indicates a type of the account associated with the request and behavior information of users of the plurality of accounts.

Clause 12. The computer-readable storage medium of clauses 6 to 11, wherein the first information about the frequency of use of the passwords associated with the plurality of accounts includes metrics which indicate an increase for the frequency of use for an individual password.

Clause 13. The computer-readable storage medium of clauses 6 to 12, wherein maintaining the first information about the frequency of use of the passwords associated with the plurality of accounts is updated according to a time threshold, the time threshold determined based at least in part on metrics associated with the plurality of accounts.

Clause 14. A computer system, comprising:

a processor; and memory including computer-executable instructions that, when executed by the processor, cause the system to at least:

maintain frequency of use information about access factors associated with a plurality of accounts, the frequency of use information about the access factors including a frequency of use for authentication information and for password information associated with an individual account of the plurality of accounts; and responsive to receiving an indication that access factors are being set for an account of the plurality of accounts:

marking the account as potentially being compromised based at least in part on a comparison of the frequency of use of the access factors associated with the account and the frequency of use information about the access factors associated with the plurality of accounts.

Clause 15. The system of clause 14, wherein the computer-executable instructions that, when executed by the processor, cause the system to further prohibit the use of particular authentication information for the account in response to a subsequent login session of the account.

Clause 16. The system of clauses 14 to 15, wherein the computer-executable instructions that, when executed by the processor, cause the system to further prohibit the use of particular password information for the account in response to a subsequent login session of the account.

Clause 17. The system of clauses 14 to 16 wherein the computer-executable instructions that, when executed by the processor, cause the system to further receive the frequency of use information about access factors associated with another plurality of accounts from a third party, wherein marking the account as potentially being compromised is further based at least in part on the comparison of the frequency of use of the access factors associated with the account and the frequency of use information about access factors associated with another plurality of accounts from a third party.

Clause 18. The system of clauses 14 to 17, wherein the comparison further comprises determining that a first distribution of the frequency of use of the access factors associated with the account are different from a second distribution indicated by the frequency of use information about the access factors associated with the plurality of accounts.

Clause 19. The system of clauses 14 to 18, wherein the password information includes a password for a particular account, the password comprised of an alpha numeric string.

Clause 20. The system of clauses 14 to 19, wherein the authentication information includes at least one of an email verification, a completely automated public turing test to tell computers and humans apart (CAPTCHA) verification, or a security question verification.

Clause 21. A computer-implemented method, comprising:
maintaining, by a computer system, first information including a first set of passwords that have been marked as potentially subject to compromise for a first plurality of accounts and first password characteristics for the first set of passwords;
receiving second information including a second set of passwords that have been marked as potentially subject to compromise for a second plurality of accounts and second password characteristics for the second set of passwords;
updating the first set of passwords included in the first information to incorporate the second set of passwords included in the second information;
determining that a password included in the updated first set of passwords is being utilized by an account of the first plurality of accounts;
generating, by the computer system, a password requirement comprising a password structure, the password requirement determined based at least in part on the updated first password characteristics for the updated first set of passwords;
generating a recommendation indicating that the password being utilized by the account be changed to adhere to the password requirement; and
providing the recommendation to a device of a user of the account.

Clause 22. The computer-implemented method of clause 21, wherein generating the recommendation indicating that the password being utilized by the account be changed is further based at least in part on a type of the account, the type of the account changing the password structure.

Clause 23. The computer-implemented method of clauses 21 to 22, wherein generating the recommendation includes determining a time period that the password requirement is valid for the account based at least in part on the updated first password characteristics for the updated first set of passwords.

Clause 24. The computer-implemented method of clauses 21 to 23, wherein determining that the password included in the updated first set of passwords is being utilized by the account of the first plurality of accounts includes using a string comparison, a sub-string comparison, a hash value comparison, or an incremental comparison.

Clause 25. The computer-implemented method of clauses 21 to 24, wherein providing the recommendation to the device of the user of the account includes providing the recommendation to an authentication information management application implemented on the device of the user.

Clause 26. A computer-readable storage medium storing computer-executable instructions that, when executed by a computer system, configure the computer system to perform operations comprising:
maintaining information including authentication information that has been marked as potentially subject to compromise for a plurality of accounts, the authentication information comprising a plurality of pieces;
for an individual piece, associating a tag that indicates access rights with respect to one or more requestors;
receiving a request for the information from a requestor of the one or more requestors;
determining a subset of the information that the requestor has access to based at least in part on the tag, the subset of the information comprising the piece of the authentication information that is associated with the tag; and
providing the subset of the information to the requestor.

Clause 27. The computer-readable storage medium of clause 26, wherein determining the subset of the information that the requestor has access to is further based at least in part on the requestor being a member of an authentication information peer network or a nonmember of the authentication information peer network.

Clause 28. The computer-readable storage medium of clauses 26 to 27, wherein receiving the request for the information from the requestor includes verifying that the requestor authenticates to a member of an authentication information peer network.

Clause 29. The computer-readable storage medium of clauses 26 to 28, wherein the one or more tags further indicate how the subset of the information may be shared within an organization represented by the requestor.

Clause 30. The computer-readable storage medium of clauses 26 to 29, further comprising
in response to receiving the request for the information from the requestor:
generating a recommendation for updating the information maintained by the requestor based at least in part on the determined subset of information that the requestor has access to; and
providing the recommendation to the requestor.

Clause 31. The computer-readable storage medium of clauses 26 to 30, wherein generating the recommendation for updating the information maintained by the requestor is further based at least in part on types of accounts maintained by the requestor.

Clause 32. The computer-readable storage medium of clauses 26 to 31, further comprising:
receiving other authentication information that has been marked as potentially subject to compromise from the requestor; and
updating the authentication information that has been marked as potentially subject to compromise for the plurality of accounts based at least in part on the received other authentication information.

Clause 33. The computer-readable storage medium of clauses 26 to 32, wherein updating the authentication information that has been marked as potentially subject to compromise for the plurality of accounts includes changing the one or more tags associated with the updated authentication information.

Clause 34. A computer system, comprising:
a processor; and
memory including computer-executable instructions that, when executed by the processor, cause the system to at least:
maintain first authentication information that has been marked as potentially subject to compromise for a first plurality of accounts;
identify one or more characteristics of compromise for the first plurality of accounts based at least in part on the first authentication information;
receive second authentication information that has been marked as potentially subject to compromise for a second plurality of accounts;
update the one or more characteristics of compromise for the first plurality of accounts based at least in part on the received second authentication information;
identify an account of the first plurality of accounts based at least in part on the updated one or more characteristics of compromise; and
provide instructions to update authentication information for the account and accounts of the first plurality of accounts that share a common user with the account.

Clause 35. The system of clause 34, wherein the computer-executable instructions that, when executed by the processor, cause the system to further:
in response to receiving the second authentication information, the second authentication information including user information associated with the second plurality of accounts;
evaluate a contact list associated with users of the first plurality of accounts based on the user information associated with the second plurality of accounts; and
notify a particular user of the first plurality of accounts of an association between the contact list of the particular user and the second authentication information that has been marked as potentially subject to compromise for the second plurality of accounts.

Clause 36. The system of clauses 34 to 35, wherein notifying the particular user of the first plurality of accounts includes analyzing incoming messages from a contact included in the contact list that shares the association between the contact list of the particular user and the second authentication information that has been marked as potentially subject to compromise for the second plurality of accounts.

Clause 37. The system of clauses 34 to 36, wherein the computer-executable instructions that, when executed by the processor, cause the system to further:
evaluate the at least one account of the first plurality of accounts to identify account activity including login request location information and the login request device information; and
provide instructions to update the authentication information for the other accounts based at least in part on the identified account activity.

Clause 38. The system of clauses 34 to 37, wherein the first authentication information and the second authentication information include one or more tags identifying access rights, the one or more tags assigned based at least in part on a type of account included in the first plurality of accounts and the second plurality of accounts.

Clause 39. The system of clauses 34 to 38, wherein the computer-executable instructions that, when executed by the processor, cause the system to further provide the updated authentication information for the first plurality of accounts to a provider of the second authentication information.

Clause 40. The system of clauses 34 to 39, wherein providing the updated authentication information for the first plurality of accounts to the provider of the second authentication information includes utilizing an application programming interface and a public/private encryption key maintained by the provider of the second authentication information.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-readable storage medium storing computer-executable instructions that, when executed by a computer system, configure the computer system to perform operations comprising:
    maintaining on the computer-readable storage medium a first set of authentication information for a first plurality of accounts;
    receiving a second set of authentication information that has been marked as potentially compromised for a second plurality of accounts;
    evaluating the first set of authentication information and the second set of authentication information;
    generating a third set of authentication information based on the evaluation of the first set of authentication information and the second set of authentication information, the third set of authentication information including at least an overlap of the first set of authentication information and the second set of authentication information; and
    updating the first set of authentication information for the first plurality of accounts based at least in part on one or more security authentication protocols and the third set of authentication information, the one or more security authentication protocols requiring updating the first set of authentication information according to a certain entropic distance measurement between the updated first set of authentication information and the third set of authentication information based on entropic characteristics of authentication information included in the first set of authentication information and the third set of authentication information, the certain entropic distance specified by an entity associated with the first plurality of accounts.

2. The computer-readable storage medium of claim 1, wherein the entropic characteristics include at least a length of the authentication information, a character set of the authentication information, complexity of the authentication information, an order of characters of the authentication information, or structural similarity of the authentication information.

3. The computer-readable storage medium of claim 1, wherein the one or more security authentication protocols requires updating the first set of authentication information according to the certain entropic distance measurement between the updated first set of authentication information, the first set of authentication information, and the third set of authentication information.

4. The computer-readable storage medium of claim 1, wherein the one or more security authentication protocols requires updating the first set of authentication information based at least in part on a non-entropic characteristic that includes at least behavior of a provider of a particular account of the first plurality of accounts.

5. The computer-readable storage medium of claim 1, wherein the overlap of the first set of authentication information and the second set of authentication information is based at least in part on the similarity between an individual piece of authentication information included in the first set of authentication information and the second set of authentication information.

6. The computer-readable storage medium of claim 1, wherein the similarity between the individual piece of the authentication information included in the first set of authentication information and the second set of authentication information includes a string comparison, a sub-string comparison, a hash value comparison, or an incremental value bitwise comparison.

7. The computer-readable storage medium of claim 1, wherein receiving the second set of authentication information that has been marked a potentially compromised includes receiving the second set of authentication information from a third party source.

8. A computer system, comprising:
    a processor; and
    memory including computer-executable instructions that, when executed by the processor, cause the system to at least:
        maintain, by a security component of the computer system, a first set of authentication information for a plurality of accounts on behalf of a user;
        receive a second set of authentication information that has been marked as potentially compromised;
        obtain operating system authentication information of the user based at least in part on the security component invoking an application program interface;
        generate, by the security component, a recommendation based at least in part on one or more security protocols, the one or more security protocols requiring that the operating system authentication information be a certain entropic distance measurement from the first set of authentication information and the second set of authentication information based on entropic characteristics of the first set of authentication information and the second set of authentication information, the certain entropic distance specified by an entity associated with the plurality of accounts and the recommendation including new operating system authentication information for the user; and
        present the recommendation to the user, the recommendation enabling the user to change the operating system authentication information to the new operating system authentication information.

9. The system of claim 8, wherein the computer-executable instructions that, when executed by the processor, cause the system to further:
    request the new operating system authentication information from the user via a user interface; and
    validate that the new operating system authentication information provided by the user adheres to the one or more security protocols.

10. The system of claim 8, wherein obtaining the operating system authentication information includes querying the operating system authentication information from the user via a user interface.

11. The system of claim 8, wherein the second set of authentication information includes structural pattern information associated with the second set of authentication information and authentication information strength of the second set of authentication information.

12. The system of claim 11, wherein generating the recommendation is further based at least in part on the structural pattern information and authentication information strength of the second set of authentication information.

13. The system of claim 8, wherein the computer-executable instructions that, when executed by the processor, cause the system to further:
   maintain one or more policies associated with the plurality of accounts, the one or more policies specifying that particular pieces of authentication information included in the first set of authentication information can violate the one or more security protocols, wherein generating the recommendation is further based at least in part on the one or more security protocols and the one or more policies.

14. The system of claim 8, wherein the computer-executable instructions that, when executed by the processor, cause the system to further:
   receive a notification from an account or service associated with the user, the notification indicating that a data breach has occurred with the account or service associated with the user; and
   in response to analyzing the notification:
      update the first set of authentication information or the operating system authentication information.

\* \* \* \* \*